US010509529B2

(12) United States Patent
Decker et al.

(10) Patent No.: US 10,509,529 B2
(45) Date of Patent: Dec. 17, 2019

(54) DYNAMIC NAVIGATION OBJECT FOR A STEP-SEQUENCER

(71) Applicant: Apple Inc., Cupertino, CA (US)

(72) Inventors: Joshua W. Decker, San Francisco, CA (US); Robert W. Baker, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/963,811

(22) Filed: Apr. 26, 2018

(65) Prior Publication Data

US 2019/0103085 A1 Apr. 4, 2019

Related U.S. Application Data

(60) Provisional application No. 62/566,288, filed on Sep. 29, 2017.

(51) Int. Cl.
*G06F 3/048* (2013.01)
*G06F 3/0484* (2013.01)
(Continued)

(52) U.S. Cl.
CPC ............ *G06F 3/048* (2013.01); *G06F 3/0487* (2013.01); *G06F 3/0488* (2013.01); *G06F 3/04842* (2013.01); *G06F 3/04847* (2013.01); *G10H 1/0008* (2013.01); *G10H 1/0016* (2013.01); *G10H 1/34* (2013.01); *G10H 1/40* (2013.01);
(Continued)

(58) Field of Classification Search
CPC ......... G10H 2220/91; G10H 2220/101; G10H 2220/106; G10H 2220/111; G10H 2220/116; G10H 2220/121; G10H 2220/126; G10H 2220/131; G06F 3/04842; G06F 3/048; G06F 3/0481; G06F 3/04812; G06F 3/04815; G06F 3/04817; G06F 3/0484; G06F 3/04845; G06F 3/04847;
(Continued)

(56) References Cited

U.S. PATENT DOCUMENTS 7,386,357 B2   6/2008   Zhang
8,208,643 B2   6/2012   Zhang
(Continued)

OTHER PUBLICATIONS

Tichko, Mixcraft 8 Teacher's Guide, 2017 Acoustica, USA.
Anderton, Sonar: Matrix Magic, Sound on Sound, Dec. 2009.

*Primary Examiner* — Andrew C Flanders
(74) *Attorney, Agent, or Firm* — Kilpatrick Townsend & Stockton LLP

(57) ABSTRACT

A method of operating a UI for controlling a virtual musical instrument implemented on a display can include receiving an input corresponding to a selection of one of a plurality of dynamic navigation objects configured on the display, the display including a cell matrix including one or more arrays of cells configured as a step-sequencer. The method can further include displaying a first portion of the cell matrix in response to a first dynamic object being selected, such that the first portion of the cell matrix is visible and the second portion of the cell matrix is not visible in the predefined area, and displaying a second portion of the cell matrix in response to a second dynamic object being selected, such that the second portion of the cell matrix is visible and the first portion of the cell matrix is not visible in the predefined area.

20 Claims, 17 Drawing Sheets

(51) Int. Cl.
*G10H 1/34* (2006.01)
*G10H 1/00* (2006.01)
*G06F 3/0488* (2013.01)
*G10H 1/40* (2006.01)
*G06F 3/0487* (2013.01)

(52) U.S. Cl.
CPC . *G10H 2220/096* (2013.01); *G10H 2220/101* (2013.01); *G10H 2240/056* (2013.01)

(58) Field of Classification Search
CPC  G06F 3/0485; G06F 3/04855; G06T 2200/24
See application file for complete search history.

(56) References Cited

U.S. PATENT DOCUMENTS

| | | |
|---|---|---|
| 8,367,922 B2 | 2/2013 | Jung et al. |
| 9,076,264 B1 | 7/2015 | Gillespie et al. |
| 9,177,538 B2 | 11/2015 | Dreher |
| 9,257,053 B2 | 2/2016 | Rassool et al. |
| 9,691,295 B2 * | 6/2017 | Rasanen ............... A63F 13/005 |
| 2003/0131715 A1 * | 7/2003 | Georges ............... G10H 1/0025 84/609 |
| 2010/0080532 A1 * | 4/2010 | Ubillos ................ G06F 3/0486 386/241 |
| 2010/0288108 A1 * | 11/2010 | Jung ..................... G06F 3/0488 84/610 |
| 2011/0083074 A1 * | 4/2011 | Jellison, Jr. ........... G06F 3/0481 715/716 |
| 2012/0014673 A1 * | 1/2012 | O'Dwyer ............. G06F 3/0346 386/282 |
| 2014/0140536 A1 * | 5/2014 | Serletic, II ........... G06F 3/0481 381/98 |
| 2015/0309844 A1 * | 10/2015 | Lowe .................... G06Q 30/02 715/716 |
| 2016/0093277 A1 * | 3/2016 | Sapp ....................... G10H 1/28 84/645 |
| 2017/0206873 A1 * | 7/2017 | Baker ................ G10H 1/0008 |

\* cited by examiner

DYNAMIC NAVIGATION OBJECT FOR A STEP-SEQUENCER

PRIORITY CLAIM

This application claims the benefit of U.S. provisional patent application No. 62/566,288, filed Sep. 29, 2017, which is herein incorporated by reference in its entirety for all purposes.

This application is related to co-pending U.S. patent application Ser. No. 15/963,791, filed on Apr. 26, 2018, entitled STEP SEQUENCER FOR A VIRTUAL INSTRUMENT; and U.S. patent application Ser. No. 15/963,818, filed on Apr. 26, 2018, entitled MODIFYING AN ARRAY OF CELLS IN A CELL MATRIX FOR A STEP-SEQUENCER. The disclosures of which are herein incorporated by reference in their entirety for all purposes.

BACKGROUND

Virtual musical instruments, such as MIDI-based or software-based rhythm sequencers (e.g., drum sequencers, drum machines, step sequencers), keyboards, guitars, basses, and the like, are ubiquitous in contemporary music across many different genres. Virtual instruments allow a user to play virtually any sound that a typical acoustic instrument could play and much more. Amateur musicians with little to no experience on a particular instrument or with music composition may find that virtual instruments are more intuitive and can provide simplified ways of creating music without needing the manual dexterity or knowledge of music theory that a conventional instrument may require.

Software-based music production tools can be used to create many different genres of music and provide resources that can allow a user to quickly and easily create musical compositions without the need for any appreciable proficiency at a particular instrument. With respect to drum sequencers, rhythmic passages can be created in real-time, in a methodical step-wise fashion, or a combination thereof. Complex drum beats and accompanying notes, chords, melodies, etc., can be created by a user, and in some cases, the software can provide shortcuts (e.g., "canned" loops, presets, etc.) that can make producing music even easier without the need for understanding its theoretical underpinnings. For instance, music production software may help a user create a drum sequence (i.e., rhythm accompaniment) without requiring the user to understand the corresponding music theory (e.g., musical key, time signature, virtual instrument tunings, etc.). As a result, software-based music production tools have become popular across many genres of music.

Conventional step sequencers, in particular, can be highly intuitive and novices may be able to create musical beats within minutes of use. Step sequencers are typically easy to operate, they can usually utilize both samples of individual sounds and full rhythmic loops, and may incorporate any of a variety of effects to alter the sound of the samples or loops, including amplification-based effects (e.g., distortion, volume control), frequency-based effects (e.g., equalization (EQ) filters, harmonizers), and delay-based effects (e.g., reverb, echo, chorus), to name a few. However, despite the usefulness and advancements in step sequencers over the years, many complain that step sequencer-based rhythmic sequences tend to sound robotic, or are musically and structurally limited because of the nature of the typical matrix-based interface. Thus, more improvements to step-sequencers are needed to enhance their flexibility and perceived musical authenticity.

Although this document refers to music production tools generally as digital audio workstations (DAWs)(e.g., touch (virtual) instrument in GarageBand® for iOS®, Logic Pro™, etc.) and/or step sequencers, drum machines, drum sequencers, etc., it should be understood that any suitable production tool can implement the concepts and embodiments described herein and can additionally include, but are not limited to, software sequencers, synthesizers, Musical Instrument Digital Interface (MIDI) keyboard workstations, software plug-ins, and the like.

SUMMARY

In some embodiments, a UI for controlling a virtual musical instrument implemented on a display can include a step sequencer having a matrix of user-selectable cells displayed in a predefined area, the matrix including: at least one row of user-selectable cells, each row of the matrix corresponding to an audio sample stored in a computer-readable medium and the cells within each array of the matrix being configured in a sequential arrangement, each cell, in response to being selected for playback and upon being triggered to begin the playback, causes the audio sample data of its corresponding array to output audio corresponding to its corresponding audio sample data, a playback control that, in response to receiving a playback input, causes a real-time playback of the corresponding audio sample data for each selected cell by triggering the playback in an order defined by a tempo and the sequential arrangement of the cells, a plurality of dynamic navigation objects including a first miniaturized representation of a first portion of the matrix of user-selectable cells and a second miniaturized representation of a second portion of the matrix of user selectable cells. In some cases, the step sequencer may be configured to display the first portion of the matrix, such that it fills the predefined area and the second portion of the matrix is not visible, in response to the first miniaturized representation being selected, and the step sequencer is configured to display the second portion of the matrix, such that it fills the predefined area and the first portion of the matrix is not visible, in response to the second miniaturized representation being selected. The matrix may correspond to a single sequenced rhythmic pattern.

In certain implementations, the first portion of the matrix can correspond to a first number of columns of user-selectable cells, and the second portion of the matrix can correspond to a second number of columns of user-selectable cells, the second number of columns of user-selectable cells being different user-selectable cells than the first number of columns of user-selectable cells. The plurality of dynamic navigation objects may be selectable thumbnails. In some cases, each of the dynamic navigation objects can depict all of the user-selectable cells of its corresponding portion of the matrix. Each dynamic navigation object can highlight any selected user-selectable cells of its corresponding portion of the matrix. Further, each dynamic navigation object can include an indicator that indicates which column of cells of its corresponding portion of the matrix are being played.

In some embodiments, a method of operating a UI for controlling a virtual musical instrument implemented on a display can include receiving an input corresponding to a selection of a dynamic navigation object of a plurality of dynamic navigation objects configured on the display, the display including a cell matrix displayed in a predefined area, the cell matrix including one or more arrays of cells, each cell within the cell matrix arranged in a sequential arrangement within its corresponding array of cells, each array of the cell matrix assigned to audio sample data stored in a computer-readable medium that, in response to being triggered, causes the audio sample data to output corresponding audio, and each cell within its particular array of the cell matrix, in response to being selected for playback and upon being triggered to begin playback, causes the audio sample data corresponding to the cell's particular array to be played, where the plurality of dynamic navigation objects includes a first miniaturized representation of a first portion of the matrix of user-selectable cells and a second miniaturized representation of a second portion of the matrix of user selectable cells; displaying the first portion of the cell matrix in response to the first miniaturized representation being selected, such that the first portion of the cell matrix is visible in the predefined area and the second portion of the cell matrix is not visible in the predefined area; and displaying the second portion of the cell matrix in response to the second miniaturized representation being selected, such that the second portion of the cell matrix is visible in the predefined area and the first portion of the cell matrix is not visible in the predefined area.

In certain implementations, the matrix can correspond to a single sequenced rhythmic pattern. The first portion of the matrix may correspond to a first number of columns of user-selectable cells, and the second portion of the matrix can correspond to a second number of columns of user-selectable cells, the second number of columns of user-selectable cells being different user-selectable cells than the first number of columns of user-selectable cells. Each of the dynamic navigation objects can depict all (or some) of the user-selectable cells of its corresponding portion of the matrix and highlights any selected user-selectable cells of its corresponding portion of the matrix. In some cases, each dynamic navigation object may include an indicator that indicates which column of cells of its corresponding portion of the matrix are being played.

In certain embodiments, a system can include one or more processors; and one or more non-transitory storage mediums containing instructions that cause the one or more processors to perform operations including: receiving an input corresponding to a selection of a dynamic navigation object of a plurality of dynamic navigation objects configured on the display, the display including a cell matrix displayed in a predefined area, the cell matrix including one or more arrays of cells, each cell within the cell matrix arranged in a sequential arrangement within its corresponding array of cells, each array of the cell matrix assigned to audio sample data stored in a computer-readable medium that, in response to being triggered, causes the audio sample data to output corresponding audio, and each cell within its particular array of the cell matrix, in response to being selected for playback and upon being triggered to begin playback, causes the audio sample data corresponding to the cell's particular array to be played, where the plurality of dynamic navigation objects includes a first miniaturized representation of a first portion of the matrix of user-selectable cells and a second miniaturized representation of a second portion of the matrix of user selectable cells; displaying the first portion of the cell matrix in response to the first miniaturized representation being selected, such that the first portion of the cell matrix is visible in the predefined area and the second portion of the cell matrix is not visible in the predefined area; and displaying the second portion of the cell matrix in response to the second miniaturized representation being selected, such that the second portion of the cell matrix is visible in the predefined area and the first portion of the cell matrix is not visible in the predefined area.

In some cases, the matrix may correspond to a single sequenced rhythmic pattern. The first portion of the matrix can correspond to a first number of columns of user-selectable cells, and the second portion of the matrix can correspond to a second number of columns of user-selectable cells, the second number of columns of user-selectable cells being different user-selectable cells than the first number of columns of user-selectable cells. Some or each of the dynamic navigation objects can depict all of the user-selectable cells of its corresponding portion of the matrix and highlight any selected user-selectable cells of its corresponding portion of the matrix. In some cases, each (or some) of the dynamic navigation objects can include an indicator that indicates which column of cells of its corresponding portion of the matrix are being played.

In further embodiments, a computer-program product tangibly embodied in a machine-readable non-transitory storage medium can include instructions to cause a processor to perform operations to: receive an input corresponding to a selection of a dynamic navigation object of a plurality of dynamic navigation objects configured on the display, the display including a cell matrix displayed in a predefined area, the cell matrix including one or more arrays of cells, each cell within the cell matrix arranged in a sequential arrangement within its corresponding array of cells, each array of the cell matrix assigned to audio sample data stored in a computer-readable medium that, in response to being triggered, causes the audio sample data to output corresponding audio, and each cell within its particular array of the cell matrix, in response to being selected for playback and upon being triggered to begin playback, causes the audio sample data corresponding to the cell's particular array to be played, where the plurality of dynamic navigation objects includes a first miniaturized representation of a first portion of the matrix of user-selectable cells and a second miniaturized representation of a second portion of the matrix of user selectable cells; display the first portion of the cell matrix in response to the first miniaturized representation being selected, such that the first portion of the cell matrix is visible in the predefined area and the second portion of the cell matrix is not visible in the predefined area; and display the second portion of the cell matrix in response to the second miniaturized representation being selected, such that the second portion of the cell matrix is visible in the predefined area and the first portion of the cell matrix is not visible in the predefined area.

In some embodiments, the matrix can correspond to a single sequenced rhythmic pattern. The first portion of the matrix can correspond to a first number of columns of user-selectable cells, and the second portion of the matrix can correspond to a second number of columns of user-selectable cells, the second number of columns of user-selectable cells being different user-selectable cells than the first number of columns of user-selectable cells. In some cases, each (or some) of the dynamic navigation objects can depict all (or some) of the user-selectable cells of its corresponding portion of the matrix and highlights any selected user-selectable cells of its corresponding portion of the matrix, and each (or some of the) dynamic navigation objects can include an indicator that indicates which column of cells of its corresponding portion of the matrix are being played.

BRIEF DESCRIPTION OF THE DRAWINGS

The detailed description is set forth with reference to the accompanying figures.

DETAILED DESCRIPTION

Figure 1:
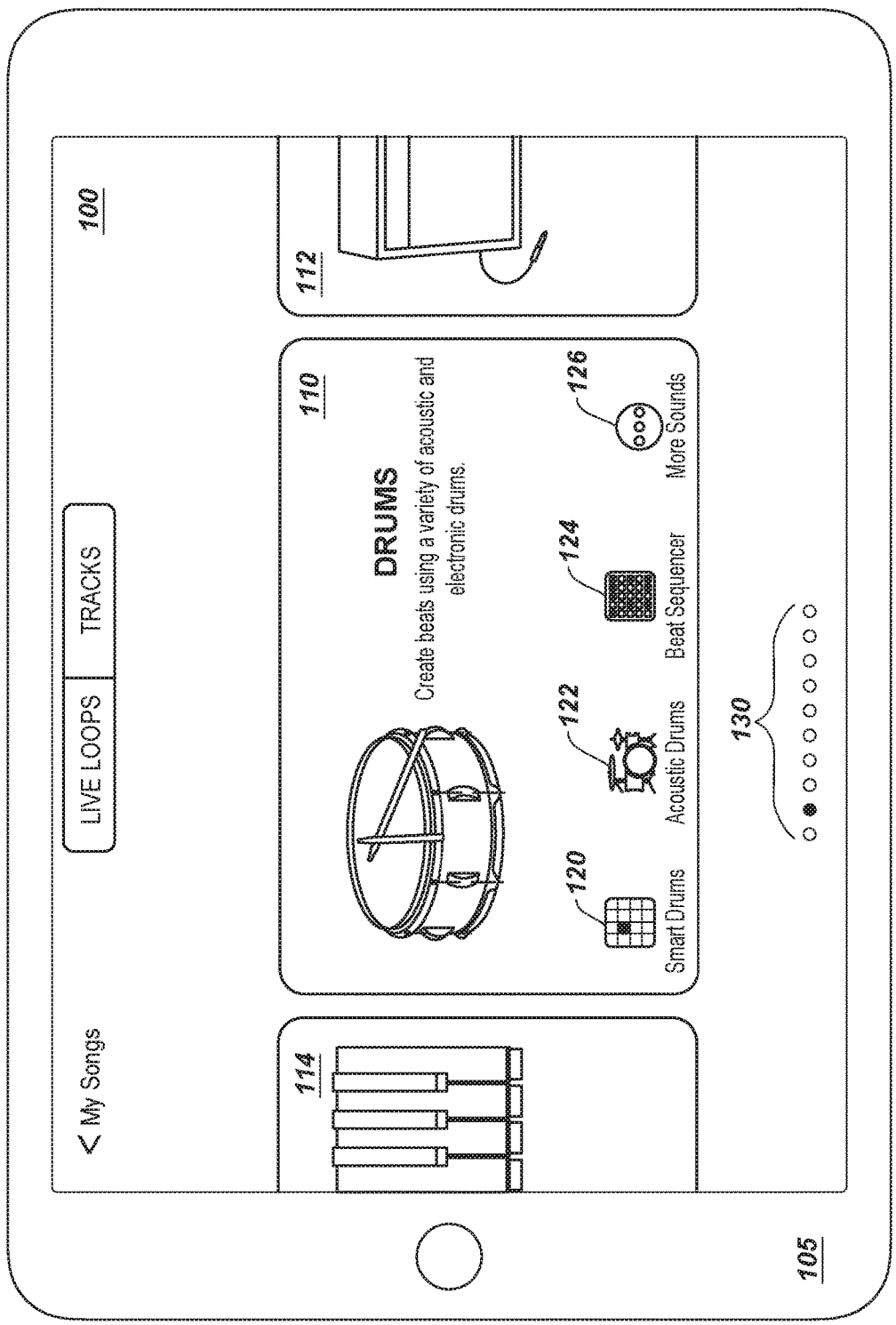
FIG. 1 shows an application selection interface for a suite of virtual instruments, according to certain embodiments.

Embodiments of the invention generally relate to software configured for generating, recording, editing, and producing musical performances. More specifically, some embodiments of the invention relate to improvements in step-sequencing in a virtual instrument.

In the following description, for the purpose of explanation, numerous examples and details are set forth in order to provide an understanding of embodiments of the present invention. It will be evident, however, to one skilled in the art that certain embodiments can be practiced without some of these details, or with modifications or equivalents thereof.

In some embodiments, systems and methods for operating a virtual instrument can include certain features that improve functionality and can streamline the user experience. For example, a method of operating a UI for controlling a step sequencer can include receiving an input (e.g., user input or automation) corresponding to a selection of a cell within a particular array (e.g., row of cells) in a cell matrix, where each cell is arranged in a particular sequential arrangement within its corresponding array of cells. For instance, the cell matrix may be arranged in a row-and-column configuration. In some cases, each array of the cell matrix can be assigned audio sample data and activates the audio sample when a corresponding cell is played. The method further includes determining a duration of the received input, adjusting an adjustable parameter (and corresponding audio characteristic) of the selected cell based on the input in response to determining that the input's duration is below a threshold time, and expanding a size of a row containing the selected cell and adjusting the adjustable parameter of the selected cell based on the input in response to determining that the input's duration is at or above a threshold time. The audio characteristic can correspond to at least one of a velocity, a volume, a probability of triggering, or a number of notes within the corresponding cell. Cells are also commonly referred to as "steps."

In further embodiments, dynamic thumbnail images can be used to switch between groupings of cells in the cell matrix. A dynamic thumbnail image may show a miniaturized display of the step sequencer matrix showing a first number of sequenced visible cells or a second number of sequenced visible cells and may each thumbnail may be selected to switch a current view to the selected thumbnail's corresponding number of cells in the cell matrix.

In certain embodiments, a length of each array in a cell matrix can be adjusted such that the starting point or ending point of a particular array may be shifted in time, which may be played synchronous or asynchronous with respect to other arrays in the cell matrix. For instance, a method can include receiving a first input corresponding to a selection of an array in a cell matrix, receiving a second input corresponding to a changing of a number of cells within the selected array, and triggering a playing back of an audio sample corresponding to each selected cell based on each selected cell's sequential order with respect to the other cells and the number of cells with each selected cell's corresponding array.

In some embodiments, the step sequencer may generate MIDI data as output that is then sent to a sampler that plays back sample data associated with certain MIDI notes. When recording the output of the step sequencer, a sequence of MIDI events are captured into the recorded song, which can later be modified and adjusted, as would be understood by one of ordinary skill in the art. In some cases, the MIDI data can also be used to trigger other types of instruments that support the MIDI protocol. In certain implementations, playback can be performed by a sampler, which receives the MIDI data provided by the sequencer and performs synthesis operations (e.g., sound shaping) on the stored sample data, and a chain of audio processing plugins, which can further modify the sound produced by the sampler.

FIG. 1 shows an application selection interface 100 for a suite of virtual instruments, according to certain embodiments. Application selection interface ("interface") 100 is shown on a tablet computer 105, however any host computing device can be any suitable computing device including, but not limited to, a desktop computer, a laptop computer, a smart phone, a PDA, a wearable devices (e.g., smart watch, smart glasses), a virtual reality/augmented reality (AR/VR) system, or the like. Interface 100 shows a suite of selectable application that may include any number of virtual instruments including, but not limited to, drum simulators, orchestral virtual instruments, virtual basses, keyboards, guitars, and world instrument, amplifier simulators, audio recorders, and the like. The applications are configured on a virtual carousel that rotates through the selectable applications. Referring to FIG. 1, interface 100 shows a virtual keyboard application 114, multiple virtual drum applications 110, and an amplifier simulator 112 on a single display, however applications can populate multiple pages, as indicated by page identifier 130.

Virtual drum applications 110 can include a variety of drum related programs including smart drum 120, acoustic drums 122, beat sequencer 124 and more sounds 126. Smart drums 120 may correspond to a drum program that alters the relative loudness and complexity of a drum pattern based on a two-dimensional (2D) user input. Acoustic drums 122 can include a virtual drum set with corresponding virtual trigger pads to trigger assigned samples of drum sounds in response to a user input (e.g., touch inputs). More sounds 126 can include a number of different virtual drum sets that function similar to acoustic drums 122, but with different types of triggers and different associated sounds. For example, some drum sets can include electronic drum kits, vintage kits, live-sound kits, house music kits, etc. Beat sequencer 124 can include a step sequencer (also referred to as a drum machine, drum sequencer, beat sequencer, etc.), as shown in FIG. 2 and described in detail throughout the present disclosure.

Figure 2:
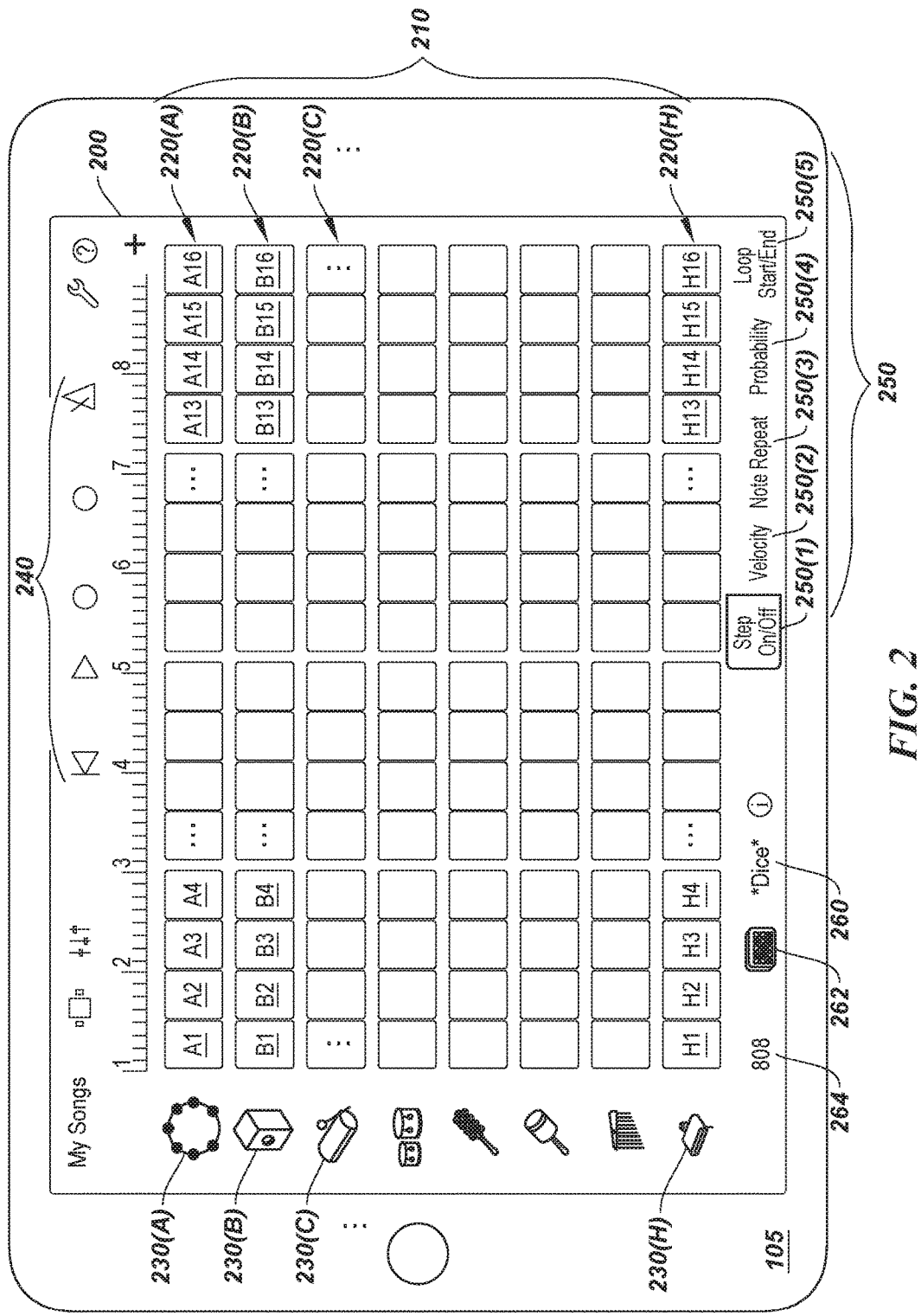
FIG. 2 shows a user interface for a step sequencer displayed on a host computing device, according to certain embodiments.

FIG. 2 shows a user interface for a step sequencer 200 displayed on host computing device 105, according to certain embodiments. Step sequencer 200 includes a cell matrix 210 having one or more arrays of user-selectable cells (e.g., rows of cells) configured in a row-and-column configuration. Cell matrix 210 can include arrays 220(A)-220(H), each shown as having 16 cells shown in groups of 4. However, any suitable number of arrays can be included with any suitable number of cells per array and in any particular grouping. Array 220(A) can include cells A1, A2, A3 . . . A16, array 220(B) can include cells B1, B2, B3 . . . B16, and so on to array 220 (H), which can include H1, H2, H3, . . . H16. Each array can be assigned a particular sample or set of samples such that any cell that is selected (see, e.g., FIG. 6A for selected and unselected cells), when triggered for playback (e.g., by a playback controller), will play the sample assigned to the array that it resides in. The cells within each array of the cell matrix are typically configured in a horizontal sequential arrangement, as shown in FIG. 2. However, some embodiments may have arrays that are vertically arranged. The cells are typically played back in the order of the sequential arrangement. For example, when the step sequencer begins playing, selected cells in column 1 (e.g., cells A1, B1, C1, H1) are played simultaneously, followed by the selected cells of column 2 (e.g., cells A2, B2, C2 . . . H2), then column 3, and so on, as would be understood by one of ordinary skill in the art.

Referring to FIG. 2, instruments 230(A)-(H) can be the samples assigned to arrays 220(A)-(H), respectively. That is, each array of the matrix can correspond to a particular audio sample data stored in a computer-readable medium, and each cell, in response to being selected for playback and upon being triggered to begin the playback, causes the audio sample data of its corresponding array to output audio corresponding to its corresponding audio sample data. For example, when A2 is selected by a user and triggered during playback, audio sample 230(A) (e.g., a tambourine sound) is played. Audio sample 230(A) can also play when A4, A5, A6, or any cells of array 220(A) are selected and triggered for playback. Similarly, audio sample 230(b) may play when any of cells B1-B16 are selected and triggered for playback, and so on for each set of arrays and corresponding cells.

Step sequencer 200 may include a playback control 240 that, in response to receiving a playback input, causes a real-time playback of the corresponding audio sample data for each selected cell by triggering the playback in an order defined by a tempo (e.g., the speed of playing through the sequence of cells) and the sequential arrangement of the cells. The playback control may include a user interface including a number of playback input controls, such as a play button, stop button, back-to-beginning button (e.g., return to the first column of cells), pause button, and the like, as shown in FIG. 2. By way of example, when the play button is pressed (e.g., a playback input), each cell in each array (e.g., row) that is selected for playback is played in sequential order from column 1 to column 16. As each column of cells is played in sequence, typically only the corresponding audio sample for each selected cell is played. In some embodiments, more or fewer cells may be included in each array. For example, some arrays may have more than 16 cells, which may extend beyond a viewable area within the display of the host computing device, as further discussed below with respect to FIGS. 6A and 6B.

In some embodiments, each cell can include an adjustable parameter 250 that, in response to an adjustment input, changes an audio characteristic of the cell's corresponding audio sample. Adjustable parameters 250 can include a step on/off control 250(1), velocity 250(2), note repeat 250(3), probability 250(4) and loop start/end 250(5), however other adjustable parameters are possible (e.g., effects (e.g., echo, reverb, drive, distortion, harmonizer, etc.), stereo pan, etc.).

When step sequencer is set to step on/off mode 250(1), selecting a particular cell (e.g., touching a cell in a touch sensitive interface, selecting a cell with a mouse-controlled cursor, etc.) may cause the cell to toggle between a playback enabled and disabled setting. For example, referring to FIG. 6A, cells A1, A10, and A16 of array 220(A) are selected to enable playback, while cells A2-A9 and A11-A15 are not selected to enable playback (e.g., they have a disabled playback setting). Any number of cells can be selected or de-selected in the cell matrix. When step on/off mode 250(1) is selected, the adjustable parameter can be the selecting/deselecting particular cells, and the audio characteristic may be playing or not playing the corresponding sample.

Figure 3A:
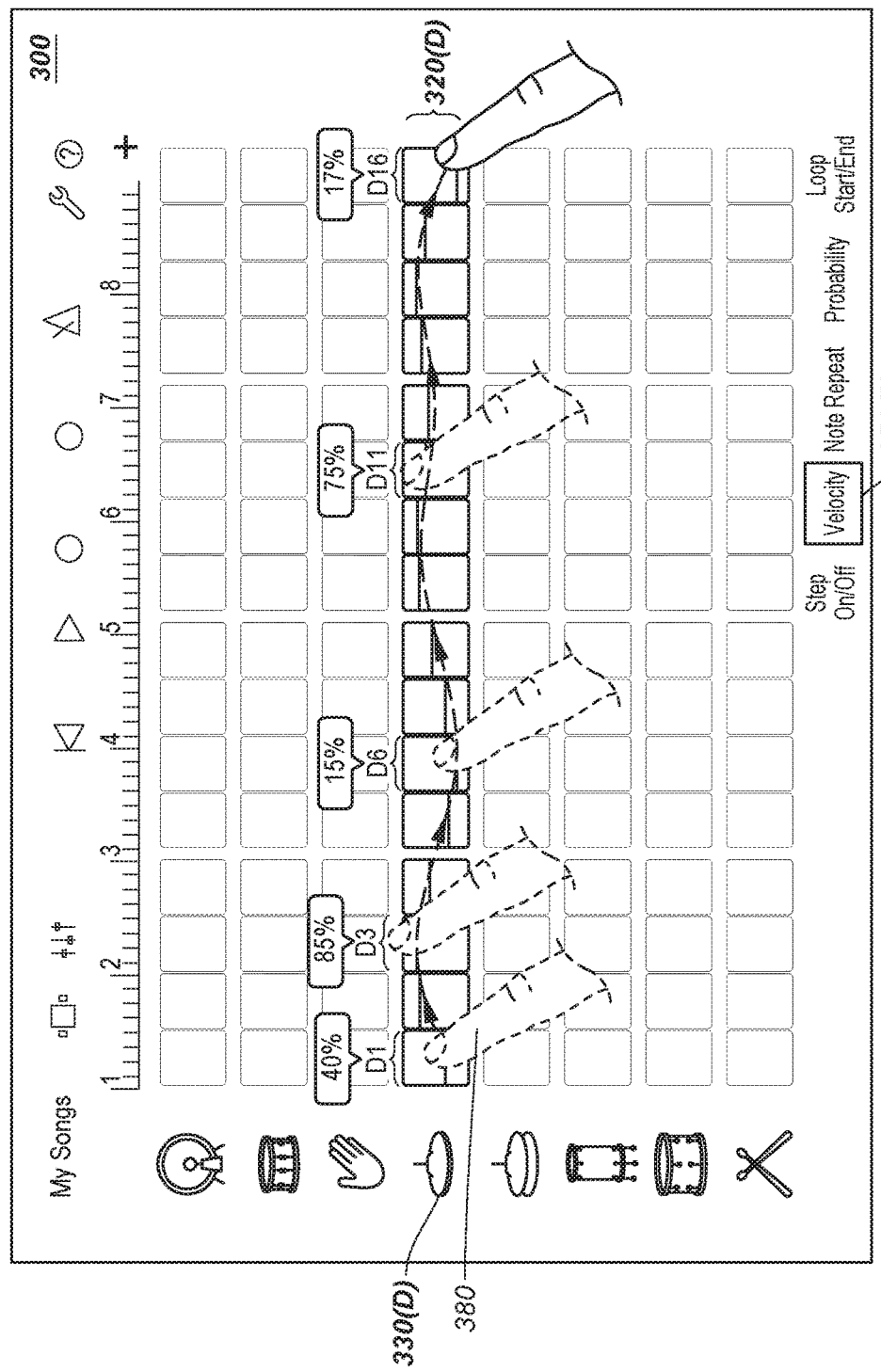
FIG. 3A shows a user setting an adjustable parameter for an audio characteristic of a corresponding sample for a plurality of cells within a row of a cell matrix, according to certain embodiments.
Figure 3B:
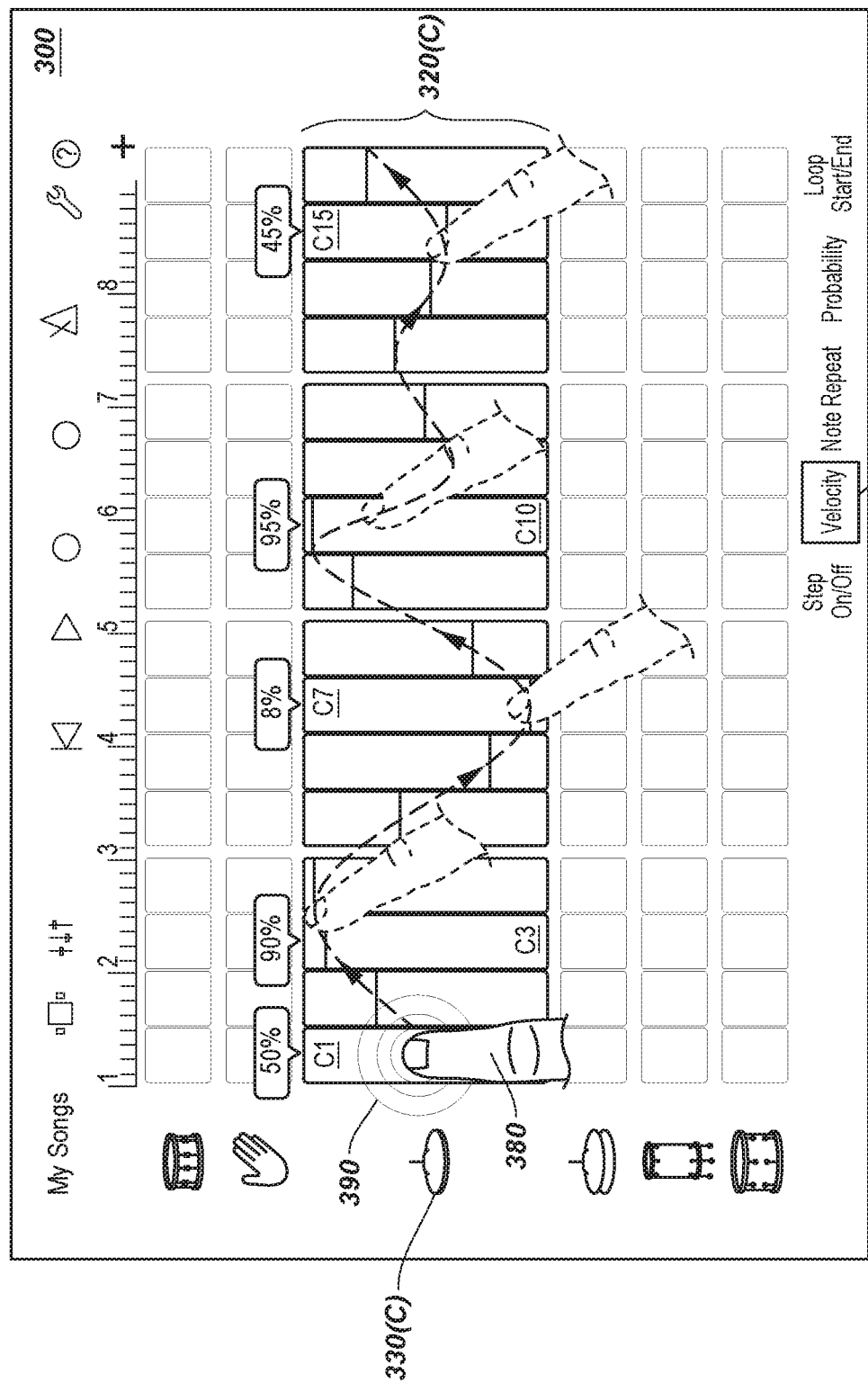
FIG. 3B shows an expansion of a row within a cell matrix and a setting of an adjustable parameter for an audio characteristic in response to a user input, according to certain embodiments.

Velocity 250(2) may correspond to a speed or force that a key or button is pressed on an instrument. For example, the harder a note is played, the higher the velocity. In electronic music (e.g., virtual instruments), velocity is often measured within a range of discrete values. In MIDI for example, velocity is typically measured on a scale from 0 to 127, with 127 being the highest value that can be registered, and 0 being the lowest. A value of 0 typically corresponds to the note being "off," while a value of 1 is typically the lowest dynamic that can be played. With respect to the application of velocity to the individual cells of cell matrix 210, velocity (e.g., the "loudness" that the corresponding sample is played) can be set by a user, as depicted in FIGS. 3A-3B, as further described below. It would be understood by one of ordinary skill in the art that any range of values, MIDI or otherwise, can be used to represent cell velocity values.

In some embodiments, a user can set a velocity level within a particular cell by setting a level (e.g., marker, bar, number, etc.) within the cell via touch, input device control (e.g., stylus, mouse, etc.) or other input means. Referring to FIG. 3A, as a user moves their finger within each cell, the velocity level is set based on the user's touch location within the cell. Any suitable representation of a velocity level can be used. One of ordinary skill in the art with the benefit of this disclosure would understand the many variations, modifications, and alternative embodiments thereof. In some embodiments, when velocity 250(2) is selected the adjustable parameter can be the set level within each particular cell, and the audio characteristic may be the loudness or intensity of the played audio sample.

Figure 4:
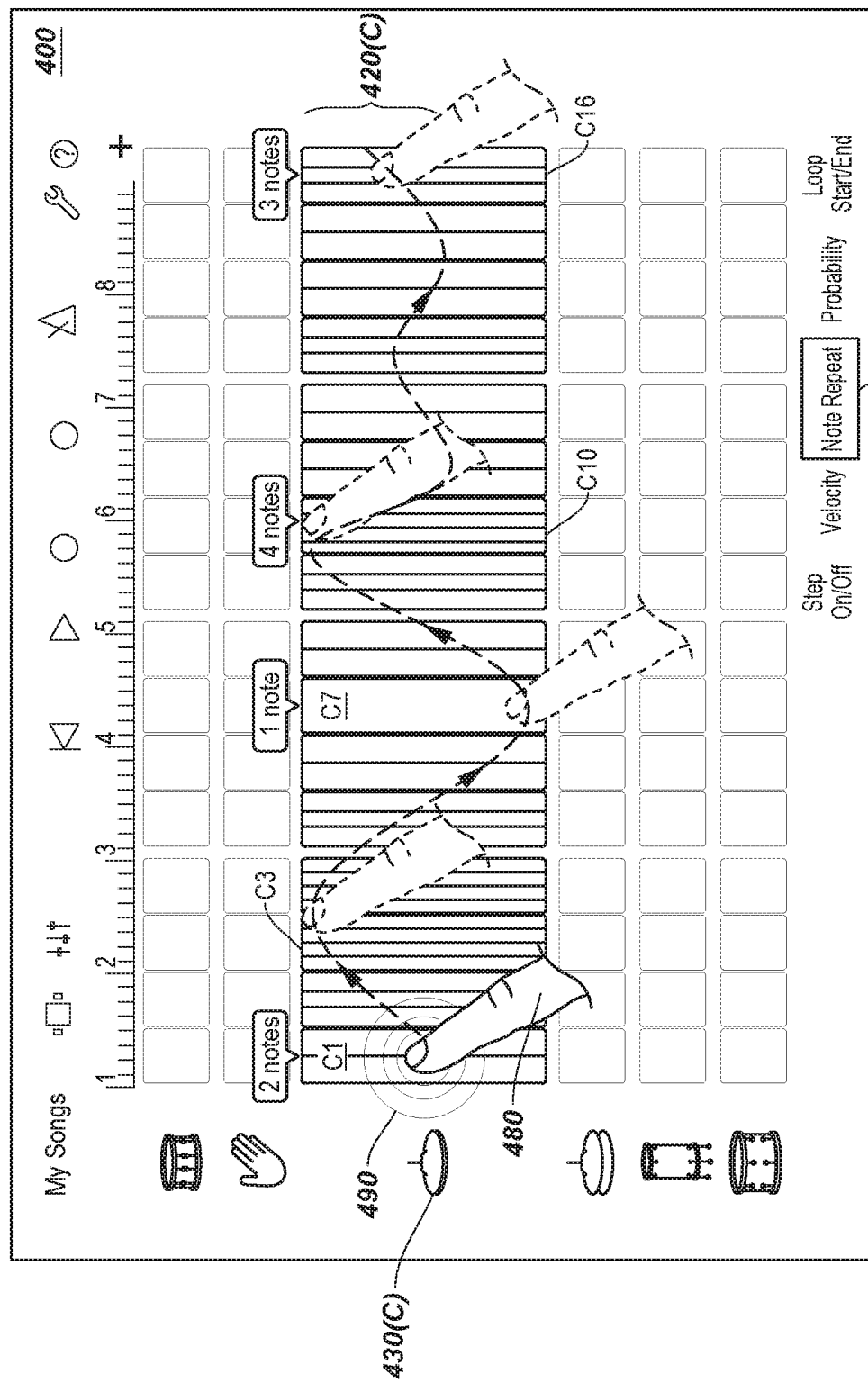
FIG. 4 shows a user setting a number of notes within a plurality of cells of a cell matrix, according to certain embodiments.

Note repeat 250(3) may correspond to a number of notes played within a cell. For example, a cell may have a default setting of playing the corresponding sample a single time when that cell is triggered for playback. In some embodiments, when velocity 250(3) is selected the adjustable parameter can be the set level within each particular cell, and the audio characteristic may be the number of times that the audio sample is triggered (played) in response to a single trigger of a corresponding single selected cell. One example of setting different note repeat values within a cell matrix is shown in FIG. 4 and further described below.

Figure 5:
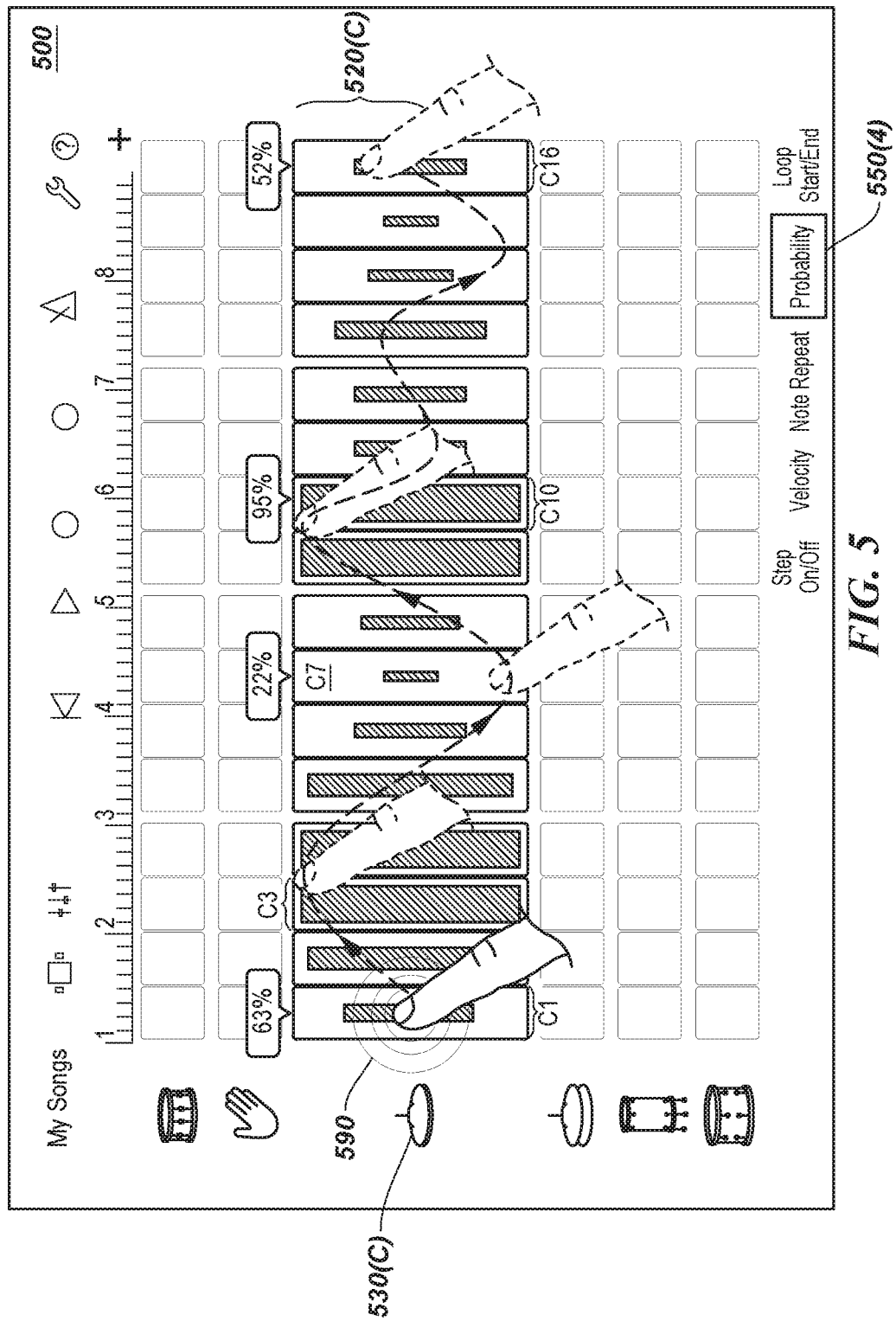
FIG. 5 shows a user setting a probability of a note trigger for a plurality of cells within a cell matrix, according to certain embodiments.

Probability 250(4) may correspond to a percentage chance that a selected cell will trigger playback of a corresponding sample. This may be useful when a user wants to give a particular performance a more "live" or nuanced feel. For example, a cell may have a default setting of playing the corresponding sample at 100% probability, such that a selected cell may trigger its corresponding sample every time. With a probability set to 50%, the selected cell may trigger playback approximately half the time. In some embodiments, when probability 250(4) is selected the adjustable parameter can be the set level of probability within each particular cell, and the audio characteristic may be the percentage chance that the audio sample is triggered (played) in response to a single trigger of a corresponding single selected cell. One example of setting a probability within a particular cell of a cell matrix is shown in FIG. 5 and further described below.

Figure 7A:
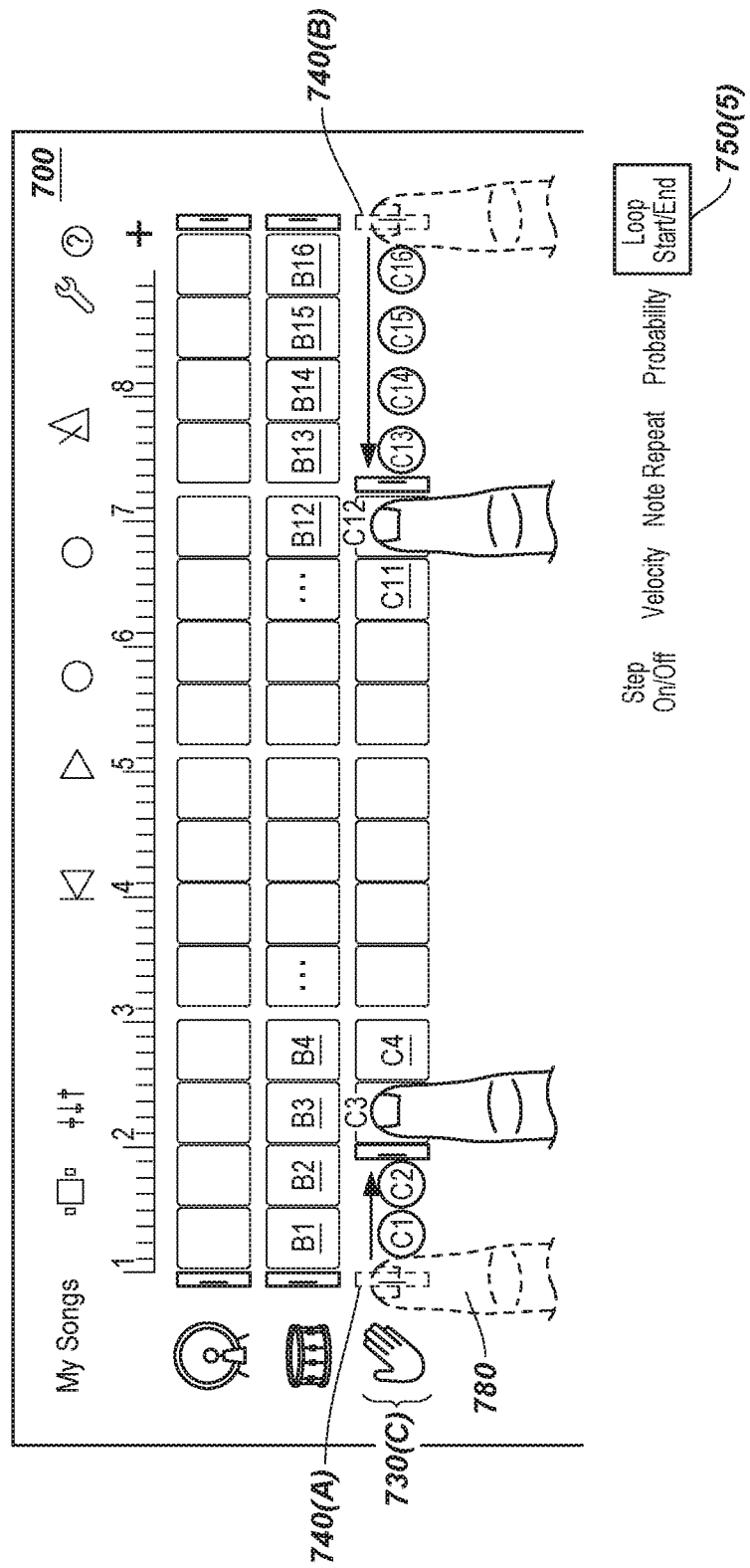
FIG. 7A shows a user setting a start and end point within an array of cells within a cell matrix, according to certain embodiments.

Loop start/end 250(5) may correspond to a setting that allows a user to change a number of cells within an array. For example, a user can remove cells from the beginning on an array and/or the end of an array. Alternatively or additionally, some embodiments may not "remove" cells from an array, but rather limits playback to a certain range of cells within that array. Some examples of changing a number of cells in an array are shown in FIG. 7A and further described below.

In some embodiments, an array can increase in size when a user is interfacing with its cells to make it easier to enter more precise values for the adjustable parameters. For example, when a user touches, presses, or "clicks" (e.g., via a mouse button or stylus) at a location within a particular cell, a corresponding adjustable parameter can be set. In some cases, in response to an extended select-and-maintained hold condition beyond a threshold time (e.g., 1 second or any suitable time frame), a displayed size of the array of the particular cell is increased and the adjustable parameter of the particular cell is adjustable according to a higher level of precision as compared to adjustments made to the adjustable parameter when the array is at a normal size. This is further described below with respect to FIGS. 3A-3B.

It should be understood that step sequencer 200 may include operative features similar to that of conventional step sequencers (in addition to the novel concepts described herein). For example, step sequencers can play multiple arrays simultaneously as a "play head" moves from left-to-right along the cell matrix. Some embodiments may play differently (e.g., right to left, or combinations as in "ping pong" operation), or may have arrays configured differently (e.g., play vertically top to bottom or vice versa). The term "play head" conventionally refers to a physical interface that interacts with certain media (e.g., laser on a laser disc, tape head on magnetic tape, etc.). With respect to the present disclosure, a play head may refer to a present column (e.g., or selection) of cells being played (e.g., see play head 630(1) of FIG. 6A). It should be understood that play head is not intended to necessarily mean a physical device, but a reference to a particular location of playback with the cell matrix. Play head may also be referred to as a "play position," a "position," a "played column," or other suitable identifier, as would be understood by one of ordinary skill in the art with the benefit of this disclosure.

FIG. 3A shows a user setting an adjustable parameter for an audio characteristic of a corresponding sample assigned to a plurality of cells within an array, according to certain embodiments. For purposes of simplification, step sequencer 300 is shown to be similar to step sequencer 200, however it should be understood that other configurations as possible (e.g., different number of arrays, cells per array, adjustable parameters, etc.). Referring to FIG. 3A, step sequencer 300 shows a user's finger moving along array 320(D) in a continuous path across each of the cells on a touch-sensitive interface (e.g., touch sensitive display of a tablet computer). Array 320(D) can include cells D1-D16, however more cells or fewer cells are possible. Audio sample 330(D) (e.g., a closed hi-hat sound) is assigned to each cell of array 320(D). Velocity 350(2) is selected as the adjustable parameter and the user's finger sets the velocity of each cell as it passes through. For example, finger 380 touches cell D1 and sets the velocity based on the location of finger 380 within cell D1, which is approximately 40% (e.g., or 50 in a MIDI range). As finger 380 continues along array 320(D), the adjustable parameter for each cell is set based on the location of the finger with respect to the cell. For example, D3 is set to 85% (101 in MIDI range), D6 is set to 15% (19 in MIDI range), D11 is set to 75% (95 in MIDI range), and D16 is set to 12% (15 in MIDI range). Note that if step on/off 350(1) was selected instead of velocity 350(2), then each cell would be toggled between selected/de-selected based on a current setting as the finger passes through (i.e., a binary selection, rather than a setting between 0 and 127).

In some cases, an adjustable parameter may be set based on the last touch location in a cell. For example, referring to FIG. 3A, as a user swipes their finger across the cells of array 320(D), finger 380 enters a cell from the left and sets the corresponding adjustable parameter. As the finger continues to move across the cell, its vertical location within the cell may change, which can thereby change the adjustable parameter—typically in real-time. Thus, the adjustable parameter may continue to be adjusted as the finger changes its position within a particular cell leaving the final position at the last location that the user touched (e.g., if swiping left to right, the last location touched on the right side of the cell).

In certain embodiments, step sequencer 300 may detect a duration of a stationary touch within a particular cell and perform certain actions based on the detected duration. For example, in response to a user touching a portion of a cell and releasing before a threshold time (e.g., 0.5 s, 1 s, etc.), then the corresponding adjustable parameter (e.g., velocity, probability, etc.) can be set to a level corresponding to the last location of the finger within the cell prior to release. This is shown, for example, in FIG. 3A as the user's finger 380 traverses through each cell left-to-right along the path shown, the corresponding level of each adjustable parameter is set approximately equal to the last location of the user's finger before leaving the particular cell. Note that the movement is continuous and not stationary, so there may be series of touch detections within a particular cell that effectively read at <0.1 s or less.

In some embodiments, in response to a user touching a portion of a cell and releasing at or greater than a threshold time (e.g., 0.5 s, 1 s, etc.), then the corresponding array of cells may be expanded in size and remain in the expanded state as the user adjusts the adjustable parameter. Referring to FIG. 3B, a user presses and holds cell C1 at location 390, causing array 320(C) to expand in size. This can be advantageous as it allows a user to set a particular adjustable parameter within a cell with more precision. In some embodiments, the number of possible levels (e.g., 0-127) within a particular cell may not change when in a normal size (e.g., see FIG. 3A) or an expanded size (e.g., see FIG. 3B), however it may be easier for a user to articulate a more precise setting in an expanded cell as there is more area to move the user's finger. In some embodiments, the user first selects and holds a position for the threshold time to cause the cell to expand. Alternatively, some embodiments may expand a cell (and corresponding array) based on an amount of time contacting the particular cell. For instance, a cell may expand in response to a user moving but continuously maintaining contact with the particular cell for the threshold time. Any suitable implementation of the expansion of the cells may be employed as would be understood by one of ordinary skill in the art with the benefit of this disclosure.

Once an array is expanded it may maintain its expanded state based on a number of factors including maintained contact with the array (including movement between cells), a threshold time, or a combination thereof. Referring to FIG. 3B, a user touches (e.g., with a finger, stylus, or input-device-controlled cursor, etc.) cell C1 at 390 and remains stationary for a threshold time (e.g., 1 s). Array 320(C) expands and the user then traverses his finger across the cells of array 320, which sets the corresponding adjustable parameter of each cell to the last location touched by the user, as described above. That is, a user first performs a "touch-and-hold" input for a threshold time at a location for the expansion to occur, and then the user may proceed with moving within the cell or on to other cells within the array for adjusting the adjustable parameter. Referring back to FIG. 3B, after the expansion of array 320(C), finger traverses along the path shown thereby setting the adjustable parameter for each cell within the array as described above. For example, C1 is set to about 50%, C3 is set to about 90%, C7 is set to about 8%, C10 is set to about 95%, and C15 is set to about 45%.

In some cases, a user may enter a particular cell in an array that is already expanded. In such cases, a "touch-and-hold" condition may not be necessary. Referring to FIG. 3B, after array 320(C) is expanded, it can remain expanded as finger 380 traverses across each adjacent cell. Thus, cells C2-C16 may not require a "touch-and-hold" input to cause array 320(C) to maintain the expanded condition. In the embodiments shown, a higher input location within a cell corresponds to a velocity for that cell. Alternatively, a higher input location within a cell may be inversely related to the velocity of the audio sample playback for that cell, such that higher placed inputs in a cell may correspond to a lower velocity as compared to lower placed inputs in the cell. In some embodiments, additional touches during the expansion operation is supported. For instance, finger 380 may expand an array (row), but another finger can also adjust parameters of the expanded array for multi-touch capabilities. One of ordinary skill in the art would understand the many variations, modifications, and alternative embodiments thereof.

FIG. 4 shows a user setting a number of notes within a plurality of cells of a cell matrix, according to certain embodiments. For purposes of simplification, step sequencer 400 is shown to be similar to step sequencer 200, however it should be understood that other configurations as possible (e.g., different number of arrays, cells per array, adjustable parameters, etc.). Referring to FIG. 4, the adjustable parameter is set to note repeat 450(3), which sets a corresponding number of notes (e.g., note repetitions) within a particular cell that can play in response to a single trigger. For example, if the adjustable parameter is set to two notes, then two notes (e.g., two instantiations) of the audio sample 430(C) will play in response to a single trigger.

Step sequencer 400 shows a user's finger 480 moving along array 420(C) in a continuous path across each of the cells on a touch-sensitive interface. Array 420(C) can include cells C1-C16, however more cells or fewer cells are possible. Audio sample 430(C) (e.g., a closed hi-hat sound) is assigned to each cell of array 420(C). Note repeat 450(3) is selected as the adjustable parameter and the user's finger sets the number of notes of each cell as it passes through. For example, finger 480 touches cell C1 and sets the number of notes based on the user input (e.g., location of finger 480), which sets 2 notes for cell C1. That is, as the cells of array 420(C) are played, C1 is played two times in response to a single trigger. As finger 380 continues along array 420(C), the adjustable parameter for each cell is set based on the location of the finger with respect to the cell. For example, C3 is set to 4 notes, C7 is set to one note, C10 is set to 4 notes, and C16 is set to 3 notes. In the embodiments shown, a higher input location within a cell corresponds to a higher number of notes for that cell. Alternatively, a higher input location within a cell may be inversely related to the number of notes within that cell, such that higher placed inputs in a cell may correspond to a fewer number of notes as compared to lower placed inputs in the cell. One of ordinary skill in the art would understand the many variations, modifications, and alternative embodiments thereof.

FIG. 5 shows a user setting a probability of a note trigger for a plurality of cells within a cell matrix, according to certain embodiments. For purposes of simplification, step sequencer 500 is shown to be similar to step sequencer 200, however it should be understood that other configurations as possible (e.g., different number of arrays, cells per array, adjustable parameters, etc.). Referring to FIG. 5, the adjustable parameter is set to probability 550(4), which sets a corresponding probability that a selected note (e.g., set via step on/off) will be triggered in response to a single trigger for that cell. For example, if the adjustable parameter is set to 50%, then there is a 50% chance that the selected cell will play the audio sample in response to the cell being set to playback.

Step sequencer 500 shows a user's finger 580 moving along array 520(C) in a continuous path across each of the cells on a touch-sensitive interface. Array 520(C) can include cells C1-C16, however more cells or fewer cells are possible. Audio sample 530(C) (e.g., a closed hi-hat sound) is assigned to each cell of array 520(C). Probability 550(4) is selected as the adjustable parameter and the user's finger sets the number of notes of each cell as it passes through. For example, finger 580 touches cell C1 and sets the number of notes based on the user input (e.g., location of finger 580), which sets a probability of 63% of playback for cell C1. That is, as the cells of array 520(C) are played, C1 is likely to be played 63% of the time in response to a single trigger. As finger 580 continues along array 520(C), the adjustable parameter for each cell is set based on the location of the finger with respect to the cell. For example, 53 is set to about 95%, C7 is set to 22%, C10 is set to 95%, and C16 is set to 52%. In the embodiments shown, a higher input location within a cell corresponds to a higher probability for that cell. Alternatively, a higher input location within a cell may be inversely related to the probability for audio sample playback for that cell, such that higher placed inputs in a cell may correspond to a lower probability as compared to lower placed inputs in the cell. One of ordinary skill in the art would understand the many variations, modifications, and alternative embodiments thereof.

Figure 6A:
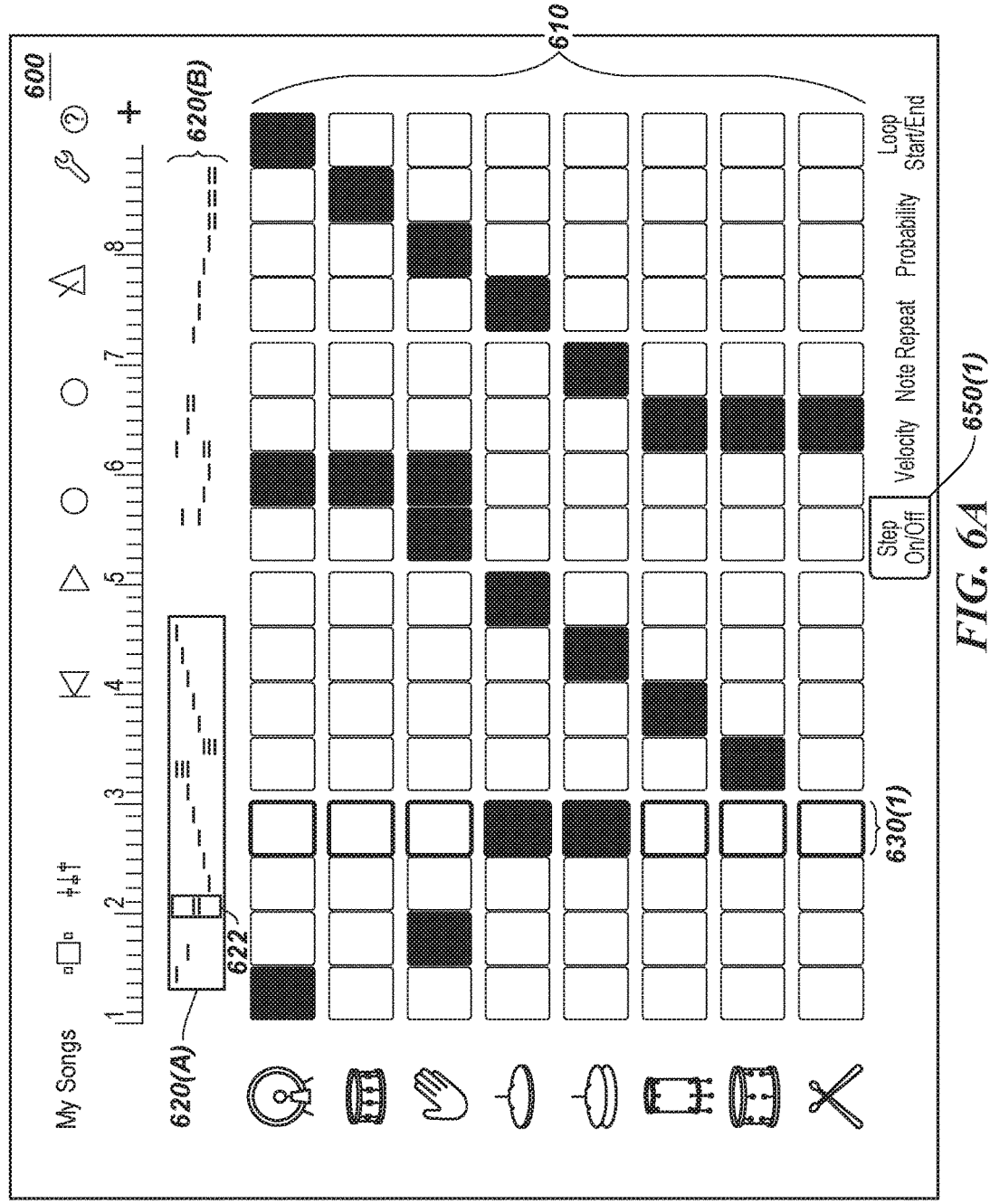
FIG. 6A shows a first portion of a cell matrix with dynamic navigation objects, according to certain embodiments.
Figure 6B:
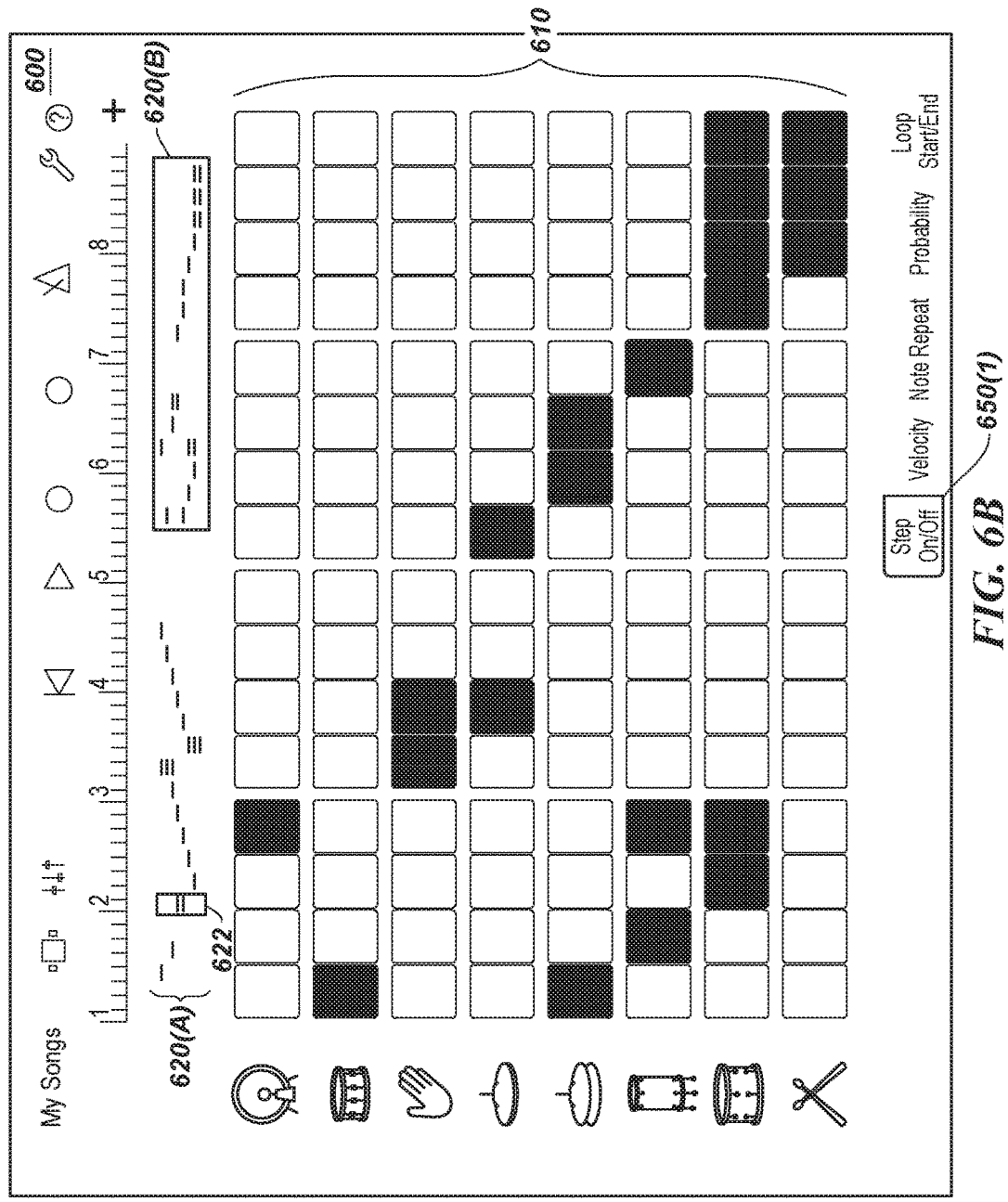
FIG. 6B shows a second portion of a cell matrix with dynamic navigation objects, according to certain embodiments.

FIG. 6A shows a portion of a cell matrix with dynamic navigation objects, according to certain embodiments. For purposes of simplification, step sequencer 600 is shown to be similar in certain aspects to step sequencer 200, however it should be understood that other configurations as possible. Step sequencer 600 includes cell matrix 610 and a number of cells selected for playback including visible cells A1, A10, A16, B10, B15, C2, C9-C10, C14, D4, D8, D13, E4, E7, E12, F6, F11, G5, G11, and H11, and non-visible cells (e.g., cells that extend beyond the display including cells in columns 17-32 as described below) including cells A4, B1, C5-C6, D6, D9, E1, E10, E11, F2, F4, F12, G3, G4, G13-G16, and H14-H16, as shown in FIG. 6B. Step sequencer 600 further includes a first dynamic navigation object 620(A) and a second dynamic navigation object 620(B). Playback head ("play head") 630(1) plays the cells in a sequential order, as described above, typically left to right such that all selected column 1 cells are played first, column 2 cells are played next, and so on to the 16 column (or last column in the pattern). Referring to FIG. 6A, playback head 630(1) is currently playing all audio samples associated with the selected column 4 cells (e.g., cells D4 and E4).

A dynamic navigation object is a selectable object that shows a miniaturized representation of a portion of cell matrix 610. Dynamic navigation objects may be useful when the length of a particular rhythm pattern extends beyond the visible UI and, when selected, may switch between different portions of a pattern that extends beyond the UI. Referring to FIG. 6A, cell matrix 610 is an 8×16 array with 8 rows and 16 columns of selectable cells. The entire rhythm pattern is an 8×32 array with 8 rows and 32 columns of selectable cells. In FIG. 6A, only columns 1-16 are visible in cell matrix 610. Dynamic navigation object 620(A) shows a miniaturized representation of an 8×16 matrix of cells, showing a relative location of all the selected cells in the first 16 columns (e.g., all cells selected using step on/off 650(1)) as well as playback timing information as playback head 622 tracks the playback head 630(1) of cell matrix 610. Dynamic navigation object 620(B) shows a miniaturized representation of an 8×16 matrix of cells showing a relative location of all the selected cells in the second set of 16 columns (e.g., all cells selected using step on/off 650(1) in columns 17-32) as well as playback timing information as playback head 622 also tracks within dynamic navigation object 620(B) when the playback head 630(1) of cell matrix 610 is playing cells in columns 17-32. Referring to FIG. 6B, playback head 622 is playing the fourth column of cells in the first portion of cells, as reflected in first dynamic navigation object 620(A). The miniaturized representation may be updated in real-time. For example, selecting or de-selecting certain cells (e.g., turning them on/off) can be simultaneously reflected in the miniaturized representation.

As indicated above, step sequencer 600 may be configured to display the first portion of the cell matrix (e.g., the cells of columns 1-16) in response to the first miniaturized representation being selected, and switch to display the second portion of the matrix (e.g., the cells of columns 17-32) in response to the second miniaturized representation being selected. Thus, when the second cells of columns 17-32 are displayed, and a user selects the first miniaturized representation (dynamic navigation object 620(A)), cell matrix 610 switches from the second cells of columns to display the first cells of columns 1-16. More or fewer dynamic navigation objects may be used, and each dynamic navigation object may correspond to any suitable number of cells within cell matrix 610. In some cases, dynamic navigation objects may show a representation of the cells, but may not show a real-time playback element (e.g., like playback head 622). In other implementations, a real-time playback element may be included, but the cell representation may not necessarily reflect the actual configuration of selected cells in the corresponding portion of cells.

FIG. 7A shows a finger 780 setting a start and end point within an array of cells within a cell matrix 700, according to certain embodiments. When adjustable parameter loop start/end 750(5) is selected, a user can change the size of an array within a cell matrix. For example, a user can shorten a length of an array of cells within a cell matrix by removing cells from the front end of the array. Similarly, a user can shorten or lengthen a span of an array be shortening or lengthening the back end of the array. In some embodiments, when loop start/end 705(5) is selected, handles may appear on the front/back end of each array indicating that the arrays are configurable for editing. Referring to FIG. 7A, finger 780 engages handle 740(A) at the front end of array 730(C) and moves it to the beginning of cell C3, which effectively deletes cells C1 and C2 from the front end of array 730(C). Similarly, finger 780 engages handle 740(B) at the back end of array 730(C) and moves it to the end of cell C12, which can effectively delete cells C13-C16 from the back end of array 730(C). Alternatively, finger 780 could have moved handle 740(B) to the right, thereby adding additional cells to array 730(C). In some cases, this may cause the number of cells to extend beyond the visible area of the cell matrix, thereby creating cells that extend into columns 17 and on. In such cases, dynamic navigation objects can be used to switch between each visible portion of cells within the pattern.

Playback for the arrays of cells within a cell matrix can be synchronous, asynchronous, or a combination thereof. In synchronous playback, one column of cells may be played at a time. For example, referring to FIG. 7A, consider that every cell of B1-B16 and C3-C12 are selected for playback. In that case, step sequencer 700 may playback cells B1 and B2 in order, while each cell in array 730(C) remains unplayed (note that cells C1 and C2 have been deleted). When the play head reaches column 3, then both of cells B3 and C3 are triggered to playback their corresponding audio sample. Cells B4/C4 through B12/C12 continue to play in a sequential and simultaneous fashion, as described above. At column 13, B13 plays and nothing is played in array 730(C) until the playback head restarts and once again reaches column 3 for synchronized playback of B3 and C3.

In asynchronous playback, each array continuously plays, which may result in different column of cells being played at the same time. For example, referring to FIG. 7A, consider again that every cell of B1-B16 and C3-C12 are selected for playback. In that case, initiating playback may cause the first cell of each array to play at the same time. Thus, B1 and C3 (the first cell in array 730(C)) may simultaneously trigger their corresponding audio sample to play back. Next, B2 and C4 can be played simultaneously and the sequence may continue in kind through B10 and C12, followed by array 730(C) looping back to its beginning such that playback continues with B11/C3, B12/C4, B13/C5, B14/C6, B15/C7, B16/C8, B1/C9, B2/C10, and so on. In some embodiments, certain rows may be individually selected for synchronous or asynchronous playback. For example, array 730(C) may be configured for asynchronous playback, while other arrays may be configured for synchronous playback. Synchronous and asynchronous playback are further illustrated in FIGS. 7B-7C. In some embodiments, the loop start/end points can be moved during playback, thus creating a moving "window" or moving "loop" within the total array of cells.

Many of the embodiments described herein refer to a "removal" of cells within an array. Alternatively or additionally, some embodiments may not actually "remove" the cells from an array, but rather limit playback to a certain range of cells within that array. Referring to FIG. 7A, instead of removing cells C1-C2 and C13-C16, playback is merely limited to cells C3-C12. This alternative treatment may be applied to any of the embodiments contemplated within the present disclosure.

Figure 7B:
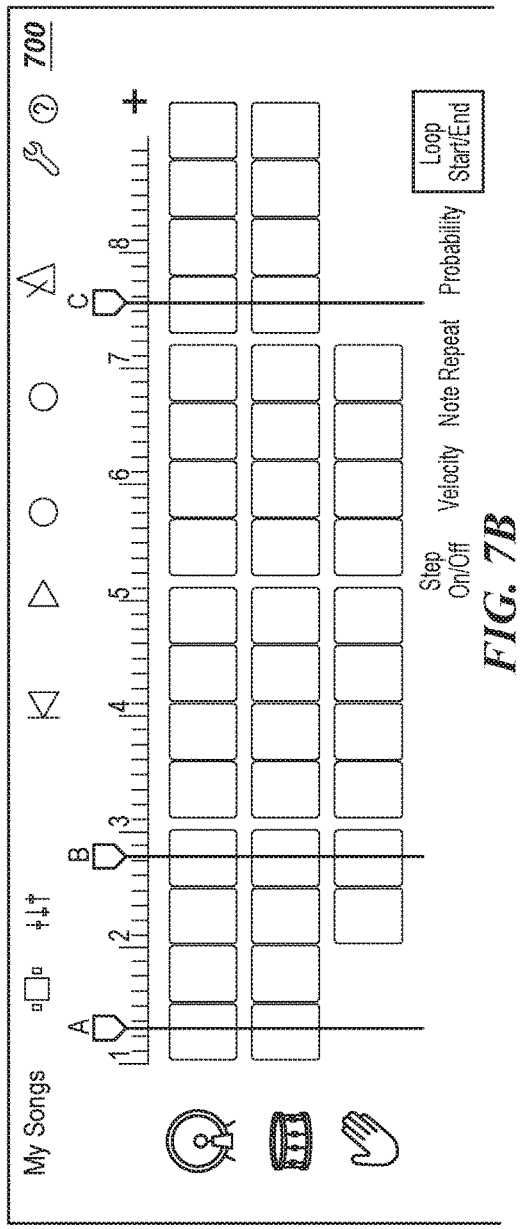
FIG. 7B shows a synchronous playback of cells within a cell matrix, according to certain embodiments.

FIG. 7B shows a synchronous playback of cells within a cell matrix, according to certain embodiments. For the purposes of illustration, assume that each cell in the cell matrix is selected for playback. At point A, cells A1 and B1 are played simultaneously, while C1 is silent as it has been deleted. Playback continues sequentially (e.g., column 1, 2, 3 . . . ) until point B, where cells A4, B4, and C4 are played simultaneously. At point C, cells A13 and B13 are played simultaneously, while cells in array 730(C) are unplayed as the play head is positioned over deleted cell C13. Thus, the play head sequentially progresses through cells 1-16 and returns to the beginning (cell 1) to continue the playback cycle (assuming that the pattern is 16 cells in length). One column at a time in continuous succession with no skips or jumps in between such that arrays (rows) that do not have cells in a particular column are silent (not triggered) until a selected cell is accessed (e.g., see FIG. 7B—cells C1-C2 and C13-C16).

Figure 7C:
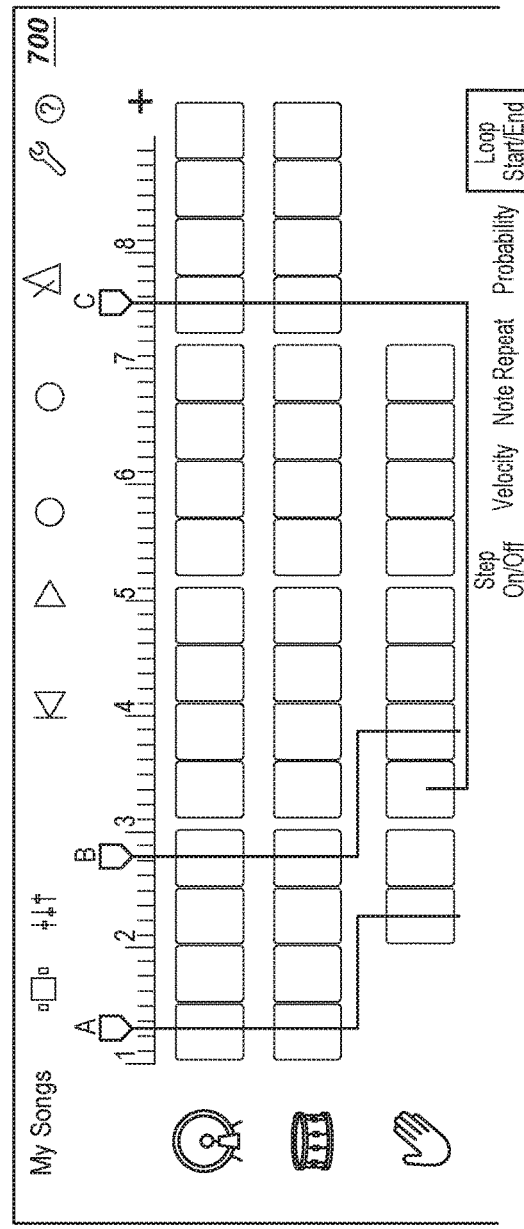
FIG. 7C shows an asynchronous playback of cells within a cell matrix, according to certain embodiments.

FIG. 7C shows an asynchronous playback of cells within a cell matrix, according to certain embodiments. Again, for the purposes of illustration, assume that each cell in the cell matrix is selected for playback. With asynchronous playback, the play head plays continuously for all arrays in the cell matrix. In some patterns, arrays may start at different positions (e.g., array 730(C) starts with cell C3, while the first two rows start with cells A1 and B2 respectively). In such cases, playback will begin with the first cell in each array and continue on, looping back to the beginning once the last cell in the array is played. For example, at point A of FIG. 7B, cells A1, B1, and C3 are played simultaneously, as these cells represent the first cell within their corresponding array. At point B, cells A4, B4, and C6 are played simultaneously. By the time the play head plays cells A10, B10, and C12, array 730(C) has reached its end and the play head for that particular array loops back to its beginning. Thus, at point C, cells A13, B13, and C5 are played simultaneously. Although FIGS. 7B-7C provide a particular arrangement of cells and arrays, it should be understood that many other arrangements are possible, including arrays that extend beyond the visible matrix (e.g., extending to 17 or more cells), alternative playback schemes (e.g., ping pong playback, reverse playback, randomized playback, etc.), and more. One of ordinary skill in the art with the benefit of this disclosure would understand the many variations, modifications, and alternative embodiments thereof.

Figure 8:
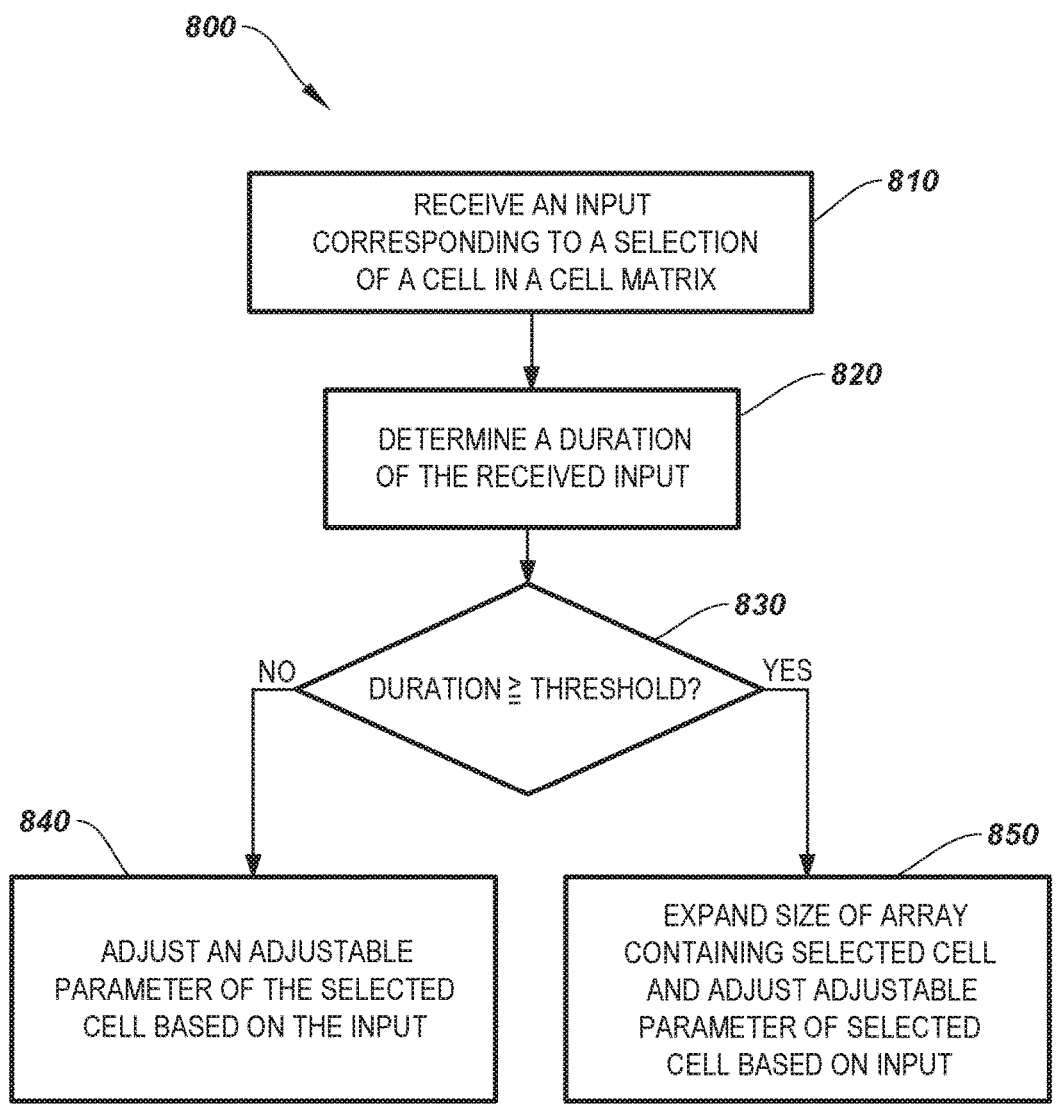
FIG. 8 is a high level flow diagram showing aspects of a method setting an adjustable parameter in a step sequencer, according to certain embodiments.

FIG. 8 is a simplified flow diagram illustrating aspects of a method 800 of setting an adjustable parameter in a step sequencer, according to certain embodiments. Method 800 illustrates how a step sequencer can determine whether to expand an array to receive a user input, as described above with respect to FIGS. 3A-3B. Method 800 can be performed by processing logic that may comprise hardware (e.g., circuitry, dedicate logic, etc.), software (which as is run on a general purpose computing system or a dedicated machine), firmware (embedded software), or any combination thereof. In some embodiments, method 800 can be performed by aspects of system 1100 of FIG. 11, including processor(s) 1105.

At 810, method 800 begins with receiving an input corresponding to a selection of a cell within a particular array of cells of a cell matrix, according to certain embodiments. The cell matrix can include one or more arrays of cells. In some cases, each cell within the cell matrix can be arranged in a sequential arrangement within its corresponding array of cells. Each array of the cell matrix may be assigned to audio sample data stored in a computer-readable medium that, when triggered, causes the audio sample data to output corresponding audio. Alternatively or additionally, each array of the cell matrix may be assigned to MIDI notes, which are associated with audio sample data to output corresponding audio. In some implementations, each cell within its particular array of the cell matrix, in response to being selected for playback and upon being triggered to begin playback, can cause the audio sample data corresponding to the cell's particular array to be played.

At 820, method 800 can continue with determining a duration of the received input. The input can be a touch on a touch-sensitive display provided by a user's finger, a stylus, or the like. In some cases, the received input may correspond to a cursor-based selection from an input device. For example, a user may manipulate a computer mouse or presenter device to control a movement of a cursor on a display. A user may press a button on the input device while the cursor is placed over a cell on the cell matrix to provide the input corresponding to a selection of the cell.

At 830, method 800 can include determining whether the duration of the received input is greater than or equal to a threshold time. The threshold time may be any suitable time, such as 0.5 s, 1 s, or any length of time. In some embodiments, the determination may be based on whether the duration is greater than the threshold time (not equal to).

At 840, in response to determining that the input's duration is below a threshold time, method 800 can include adjusting an adjustable parameter of the selected cell based on the input, the adjustable parameter configured to change an audio characteristic of the selected cell's corresponding audio sample data. The audio characteristic may correspond to at least one of a velocity, a volume, a probability of triggering, or a number of notes within the corresponding cell.

At 850, in response to determining that the input's duration is at or above a threshold time, method 800 can include expanding a size of an array containing the selected cell and adjusting the adjustable parameter of the selected cell based on the input. In some cases, the array may already be expanded. In such cases, in response to determining that the input's duration is below a threshold time and the corresponding array containing the selected cell is already expanded, method 800 can include adjusting the adjustable parameter of the selected cell based on the input and not changing the size of the corresponding array.

It should be appreciated that the specific steps illustrated in FIG. 8 provides a particular method of setting an adjustable parameter in a step sequencer, according to an embodiment of the present invention. Other sequences of steps may also be performed according to alternative embodiments. In certain embodiments, method 800 may perform the individual steps in a different order, at the same time, or any other sequence for a particular application. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method.

Figure 9:
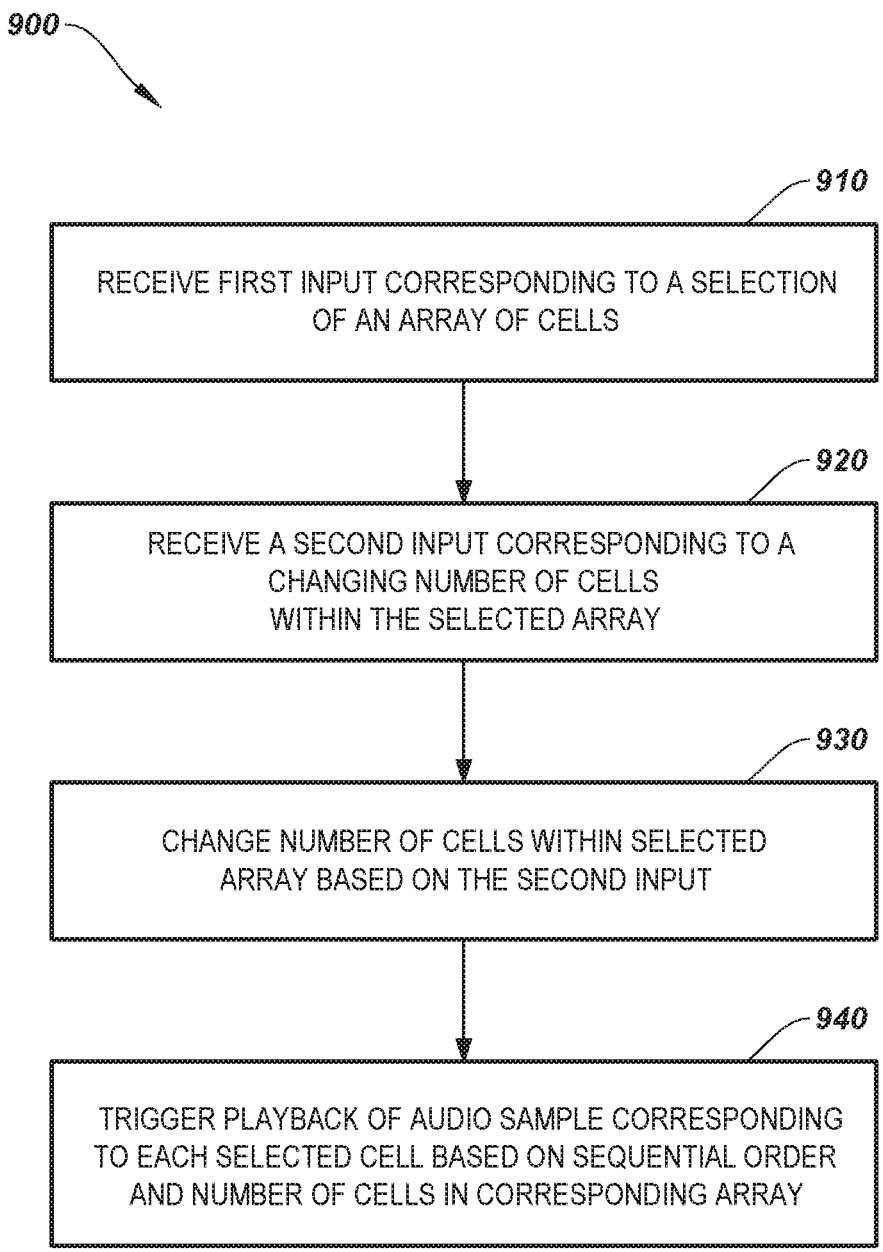
FIG. 9 is a high level flow diagram showing aspects of a method of controlling a virtual instrument implemented on a display, according to certain embodiments.

FIG. 9 is a simplified flow diagram illustrating aspects of a method 900 of controlling a virtual instrument implemented on a display, according to certain embodiments. Method 900 illustrates how a number of cells in a array can be changed, and how the step sequencer may operate playback with arrays having differing lengths, as further discussed above with respect to FIGS. 7A-7C. Method 900 can be performed by processing logic that may comprise hardware (e.g., circuitry, dedicate logic, etc.), software (which as is run on a general purpose computing system or a dedicated machine), firmware (embedded software), or any combination thereof. In one embodiment, method 900 is performed by aspects of system 1100 of FIG. 11, including processor(s) 1105

At 910, method 900 begins with receiving a first input corresponding to a selection of an array of cells within a cell matrix, according to certain embodiments. The cell matrix may include one or more arrays of cells, with each cell within the cell matrix arranged in a sequential arrangement within its corresponding array of cells. Each array of the cell matrix may be assigned to audio sample data stored in a computer-readable medium that, when triggered, causes the audio sample data to output corresponding audio. In some cases, each cell within its particular array of the cell matrix, in response to being selected for playback and upon being triggered to begin playback, may cause the audio sample data corresponding to the cell's particular array to be played. The input can be a touch on a touch-sensitive display provided by a user's finger, a stylus, or the like. In some cases, the received input may correspond to a cursor-based selection from an input device. For example, a user may manipulate a computer mouse or presenter device to control a movement of a cursor on a display. A user may press a button on the input device while the cursor is placed over a cell on the cell matrix to provide the input corresponding to a selection of the cell.

At 920, method 900 can continue with receiving a second input corresponding to a changing of a number of cells within the particular selected array. This may include removing cells from the beginning or the end of an array, as shown in FIG. 7A. In some cases, the array may be extended and additional cells can be added. For example, a 16-cell array may be extended to a 32 cell array. Arrays can be adjusted to include any suitable number of cells.

At 930, method 900 continues with changing the number of cells within the selected array based on the second input. That is, the number of cells are changed in response to the user's second input that corresponded to a changing of the size of the array.

At 940, method 900 can include triggering a playing back of the audio sample corresponding to each selected cell based on each selected cell's sequential order with respect to the other cells and the number of cells with each selected cell's corresponding row. Step 940 may correspond to asynchronous playback, as described above with respect to FIG. 7C. That is, each cell of an array can be played consecutively in sequential order (e.g., a first cell in an array is played first, followed by the second cell in the array). The playback may further be based on the number of cells in the array. Referring to FIG. 7C, some of the cells are removed from array 730(C). Instead of waiting until the play head reaches a playable cell in the array, playback continuously loops through the playable cells independent of what is happening in the other cells. In other words, an array with 10 cells will loop playback through the 10 cells, even though other arrays with different numbers of cells are being played asynchronously (i.e., multiple columns of cells may be played simultaneously). In some embodiments, playback may be synchronous, as shown in FIG. 7B, where only one column of cells is played at a time. One of ordinary skill in the art would understand the many variations, modifications, and alternative embodiments thereof.

It should be appreciated that the specific steps illustrated in FIG. 9 provides a particular method of controlling a virtual instrument implemented on a display, and more particular, how a number of cells in a array can be changed, according to certain embodiments. Other sequences of steps may also be performed according to alternative embodiments. In certain embodiments, method 900 may perform the individual steps in a different order, at the same time, or any other sequence for a particular application. Moreover, the individual steps illustrated in FIG. 9 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method.

Figure 10:
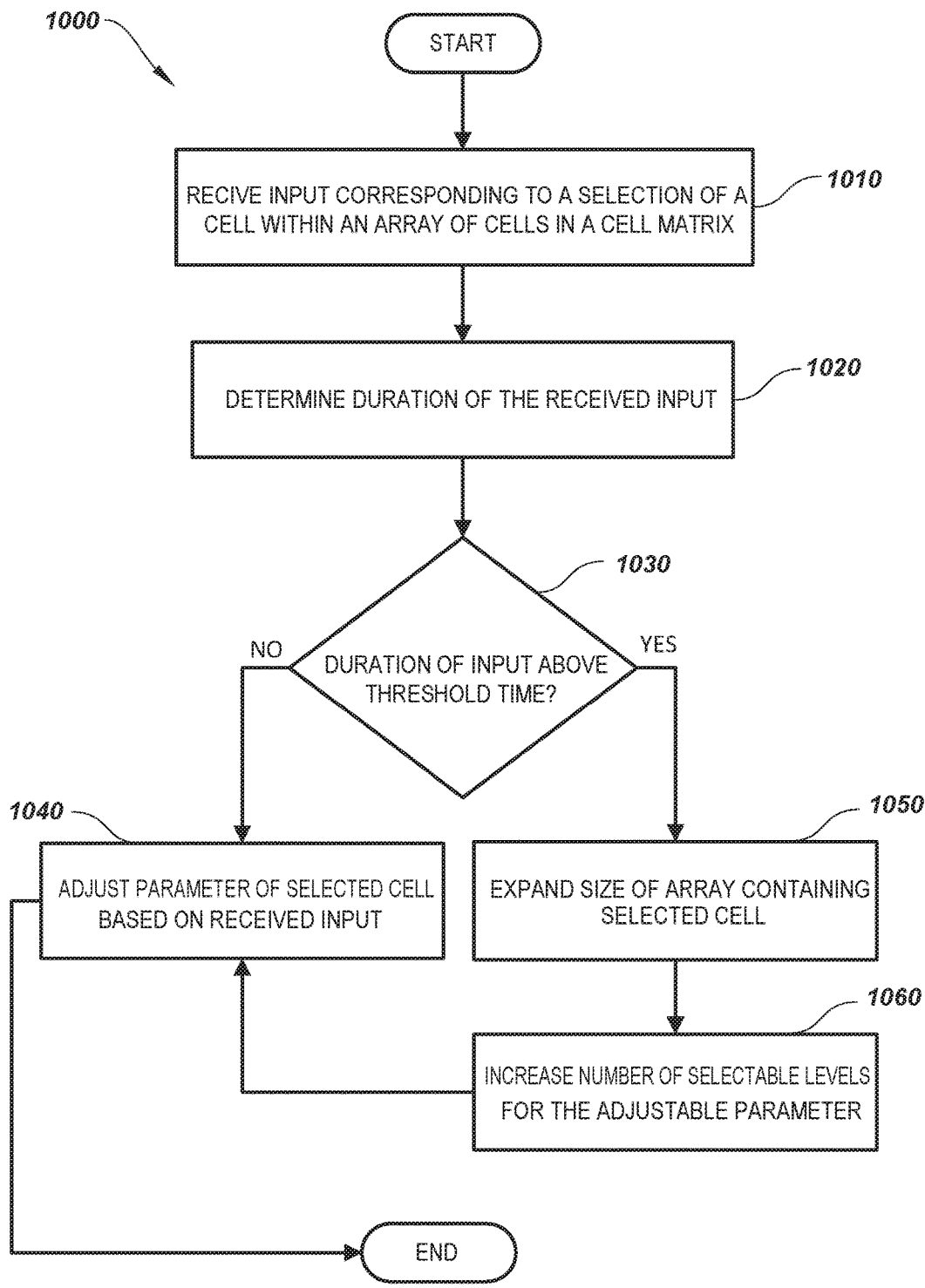
FIG. 10 is a simplified flow diagram illustrating aspects of a method of adjusting a parameter in a virtual instrument, according to certain embodiments.

FIG. 10 is a simplified flow diagram illustrating aspects of a method 1000 of adjusting a parameter in a virtual instrument (e.g., step sequencer), according to certain embodiments. Method 1000 can be performed by processing logic that may comprise hardware (e.g., circuitry, dedicate logic, etc.), software (which as is run on a general purpose computing system or a dedicated machine), firmware (embedded software), or any combination thereof. In some embodiments, method 1000 can be performed by aspects of system 1400 of FIG. 14, including processor(s) 1405.

At block 1010, method 1000 can include receiving an input corresponding to a selection of a cell within a particular array of cells of a cell matrix, according to certain embodiments. The cell matrix can include one or more arrays of cells. Each cell within the cell matrix may be arranged in a sequential arrangement within its corresponding array of cells, and each array of the cell matrix may be assigned to audio sample data stored in a computer-readable medium that, in response to being triggered, causes the audio sample data to output corresponding audio. In some cases, each cell within its particular array of the cell matrix, in response to being selected for playback and upon being triggered to begin playback, may cause the audio sample data corresponding to the cell's particular array to be played.

At block 1020, method 1000 can include determining a duration of the received input, according to certain embodiments. In response to determining that the input's duration is below a threshold time (block 1030), method 1000 can include adjusting an adjustable parameter of the selected cell based on the input, where the adjustable parameter may be configured to change an audio characteristic of the selected cell's corresponding audio sample data (block 1040). In response to determining that the input's duration is at or above a threshold time (block 1030), method 1000 can include expanding a size of an array containing the selected cell and adjusting the adjustable parameter of the selected cell based on the input (block 1050). In some cases, the input can be a detected touch on the display or an input by a control device (e.g., cursor controlled by a computer mouse). The audio characteristic may correspond to at least one of a velocity, a volume, a probability of triggering, or a number of notes within the corresponding cell. Other characteristics may be implemented including stereo panning, filters, audio effects (e.g., an amount of compression, distortion, delay, etc.), or the like. One of ordinary skill in the art with the benefit of this disclosure would understand the many variations, modifications, and alternative embodiments thereof.

At block 1060, method 1000 can include increasing a number of selectable levels for the adjustable parameter. Examples of expanding a size of an array (e.g., row of cells) in response to a press-and-hold beyond a threshold time are shown and described above with at least with respect to FIGS. 3B-5. In some cases, in response to determining that the input's duration is below a threshold time and the corresponding array containing the selected cell is already expanded, method 1000 can include adjusting the adjustable parameter of the selected cell based on the input. In situations where the array is expanded in size, a higher number of selectable levels for the adjustable parameter may be available, as compared to when the array is not expanded in size.

It should be appreciated that the specific steps illustrated in FIG. 10 provides a particular method of controlling a virtual instrument implemented on a display, and more particular, how a number of cells in a array can be changed, according to certain embodiments. Other sequences of steps may also be performed according to alternative embodiments. In certain embodiments, method 900 may perform the individual steps in a different order, at the same time, or any other sequence for a particular application. Although a particular threshold is described, it would be understood by one of ordinary skill in the art with the benefit of this disclosure that threshold bands instead of singular values can be used, durations above but not necessarily at the threshold may trigger the expansion of the array, or other threshold configuration. The individual steps illustrated in FIG. 10 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method.

Figure 11:
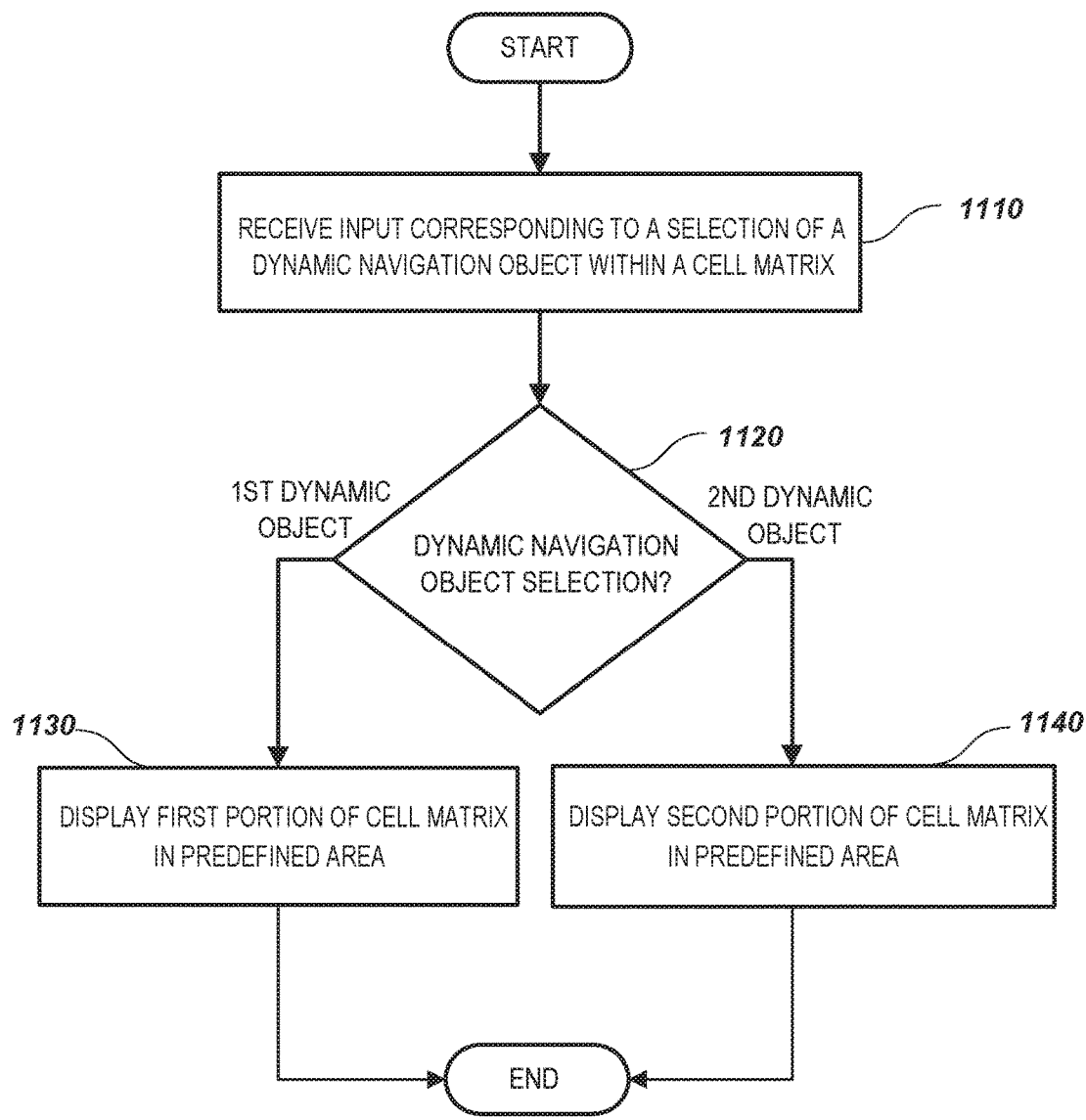
FIG. 11 is a simplified flow diagram illustrating aspects of a method of switching between groups of cells in a cell matrix, according to certain embodiments.

FIG. 11 is a simplified flow diagram illustrating aspects of a method 1100 of switching between groups of cells in a cell matrix, according to certain embodiments. Method 1000 can be performed by processing logic that may comprise hardware (e.g., circuitry, dedicate logic, etc.), software (which as is run on a general purpose computing system or a dedicated machine), firmware (embedded software), or any combination thereof. In some embodiments, method 1000 can be performed by aspects of system 1400 of FIG. 14, including processor(s) 1405.

At block 1110, method 1100 can include receiving an input corresponding to a selection of a dynamic navigation object of a plurality of dynamic navigation objects configured on the display. The display may include a cell matrix displayed in a predefined area. The cell matrix can include one or more arrays of cells, where each cell within the cell matrix can be arranged in a sequential arrangement within its corresponding array of cells. In some embodiments, each array (or subset of the total number of arrays) of the cell matrix can be assigned to audio sample data stored in a computer-readable medium that, in response to being triggered, causes the audio sample data to output corresponding audio. In some cases, each cell within its particular array of the cell matrix, in response to being selected for playback and upon being triggered to begin playback, may cause the audio sample data corresponding to the cell's particular array to be played. The predefined area can be a designated region on the display to render the cell matrix. For instance, the area occupied by cell matrix 610 of FIG. 6A may be the predefined area. The cell matrix may extend beyond what is rendered in the predefined area. For example, 16 columns are shown, but a single sequenced pattern (e.g., rhythmic pattern) may extend beyond 16 columns, as described above with respect to FIGS. 6A-6B.

In some embodiments, the plurality of dynamic navigation objects may include a first miniaturized representation of a first portion of the matrix of user-selectable cells and a second miniaturized representation of a second portion of the matrix of user selectable cells. The first portion of the cell matrix may correspond to a first number of columns of user-selectable cells, and the second portion of the cell matrix may correspond to a second number of columns of user-selectable cells, the second number of columns of user-selectable cells being different user-selectable cells than the first number of columns of user-selectable cells. Each of the dynamic navigation objects may depicts all of the user-selectable cells (or a portion thereof) of its corresponding portion of the cell matrix and highlights selected user-selectable cells of its corresponding portion of the cell matrix. In some embodiments, each dynamic navigation object may include an indicator that indicates which column of cells of its corresponding portion of the matrix are being played.

At block 1130, in response to the first dynamic navigation object being selected, method 1100 can include displaying the first portion of the cell matrix in response to the first miniaturized representation being selected, such that the first portion of the cell matrix is visible in the predefined area and the second portion of the cell matrix is not visible in the predefined area.

At block 1140, in response to the first dynamic navigation object being selected, method 1100 can include displaying the second portion of the cell matrix in response to the second miniaturized representation being selected, such that the second portion of the cell matrix is visible in the predefined area and the first portion of the cell matrix is not visible in the predefined area.

It should be appreciated that the specific steps illustrated in FIG. 11 provides a particular method of switching between groups of cells in a cell matrix, according to certain embodiments. Other sequences of steps may also be performed according to alternative embodiments. In certain embodiments, method 900 may perform the individual steps in a different order, at the same time, or any other sequence for a particular application. Moreover, the individual steps illustrated in FIG. 9 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method.

Figure 12:
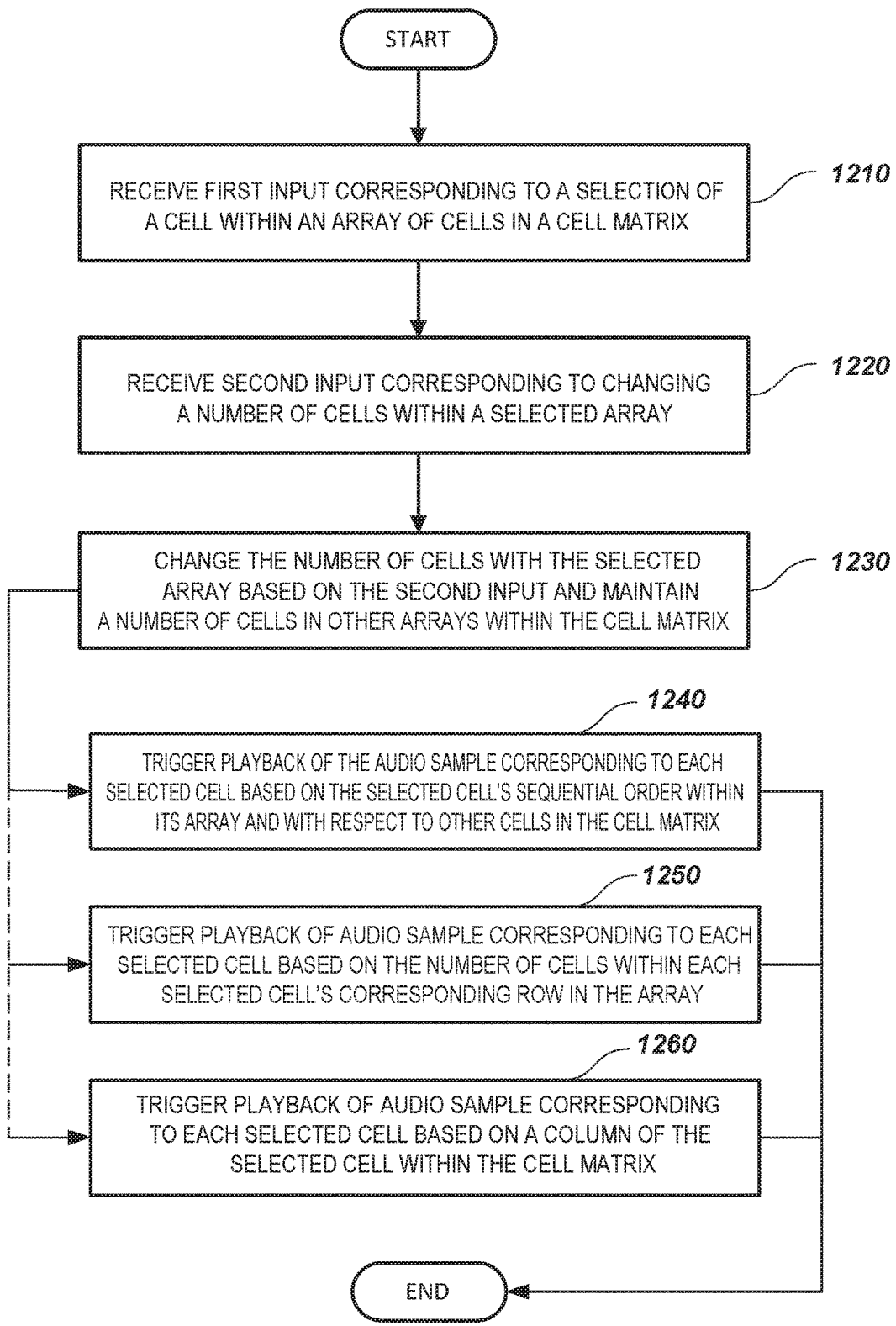
FIG. 12 is a simplified flow diagram illustrating aspects of a method of modifying a playback of a virtual instrument implemented on a display, according to certain embodiments.

FIG. 12 is a simplified flow diagram illustrating aspects of a method 1200 of modifying a playback of a virtual instrument implemented on a display, according to certain embodiments. Method 1200 illustrates how a number of cells in a array can be changed, and how the step sequencer may operate playback with arrays having differing lengths, as further discussed above with respect to FIGS. 7A-7C. Method 1200 can be performed by processing logic that may comprise hardware (e.g., circuitry, dedicate logic, etc.), software (which as is run on a general purpose computing system or a dedicated machine), firmware (embedded software), or any combination thereof. In some embodiments, method 1200 can be performed by aspects of system 1400 of FIG. 14, including processor(s) 1405

At block 1210, method 1200 can include receiving a first input corresponding to a selection of an array of cells within a cell matrix. The cell matrix can include one or more arrays of cells (e.g., see FIG. 2) with each cell within the cell matrix, or a portion thereof, arranged in a sequential arrangement within its corresponding array of cells. In some cases, each array of the cell matrix can be assigned to audio sample data stored in a computer-readable medium that, in response to being triggered, causes the audio sample data to output corresponding audio. Each cell within its particular array of the cell matrix, in response to being selected for playback and upon being triggered to begin playback, can cause the audio sample data corresponding to the cell's particular array to be played.

At block 1220, method 1200 can include receiving a second input corresponding to a changing of a number of cells within the particular selected array.

At block 1230, method 1200 can include changing the number of cells within the selected array based on the second input and maintaining a number of cells in other arrays within the cell matrix. In some cases, the second input can cause a playback start point of the selected array to move from a first location at a first cell of the selected array to a second location at a second cell of the selected array. The second input may include a touch input corresponding to a detected touch moving from the first location to the second location, as shown in FIG. 7A, or an input by a control device (e.g., cursor controlled by a computer mouse). One of ordinary skill in the art with the benefit of this disclosure would understand the many variations, modifications, and alternative embodiments thereof.

Triggering playback of audio samples for each row of selected cells can be performed in a number of different ways. For instance, at block 1240, method 1200 can include triggering a playback of the audio sample corresponding to each selected cell within the matrix based on each selected cell's sequential order within its array and the selected cell's sequential order with respect to other cells within the cell matrix. In some embodiments, playback of each array of cells within the cell matrix begins simultaneously with a first cell at a beginning of each array of cells, as further discussed above. Alternatively or additionally, triggering a playback of the audio sample corresponding to each selected cell can be based on the number of cells within each selected cell's corresponding row (block 1250), or triggering a playback of the audio sample corresponding to each selected cell may be based on a column of the selected cell within the cell matrix (block 1260). In some embodiments, the second input can correspond to a removing of one or more cells from a beginning or an end of the selected array. In some cases, the second input can correspond to a change in a playback timing of a beginning or an end of the selected array.

It should be appreciated that the specific steps illustrated in FIG. 12 provides a particular method of modifying a playback of a virtual instrument implemented on a display, and more particularly, how a number of cells in a array can be changed, according to certain embodiments. Other sequences of steps may also be performed according to alternative embodiments. In certain embodiments, method 1200 may perform the individual steps in a different order, at the same time, or any other sequence for a particular application. Moreover, the individual steps illustrated in FIG. 12 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method.

System Architecture

Figure 13:
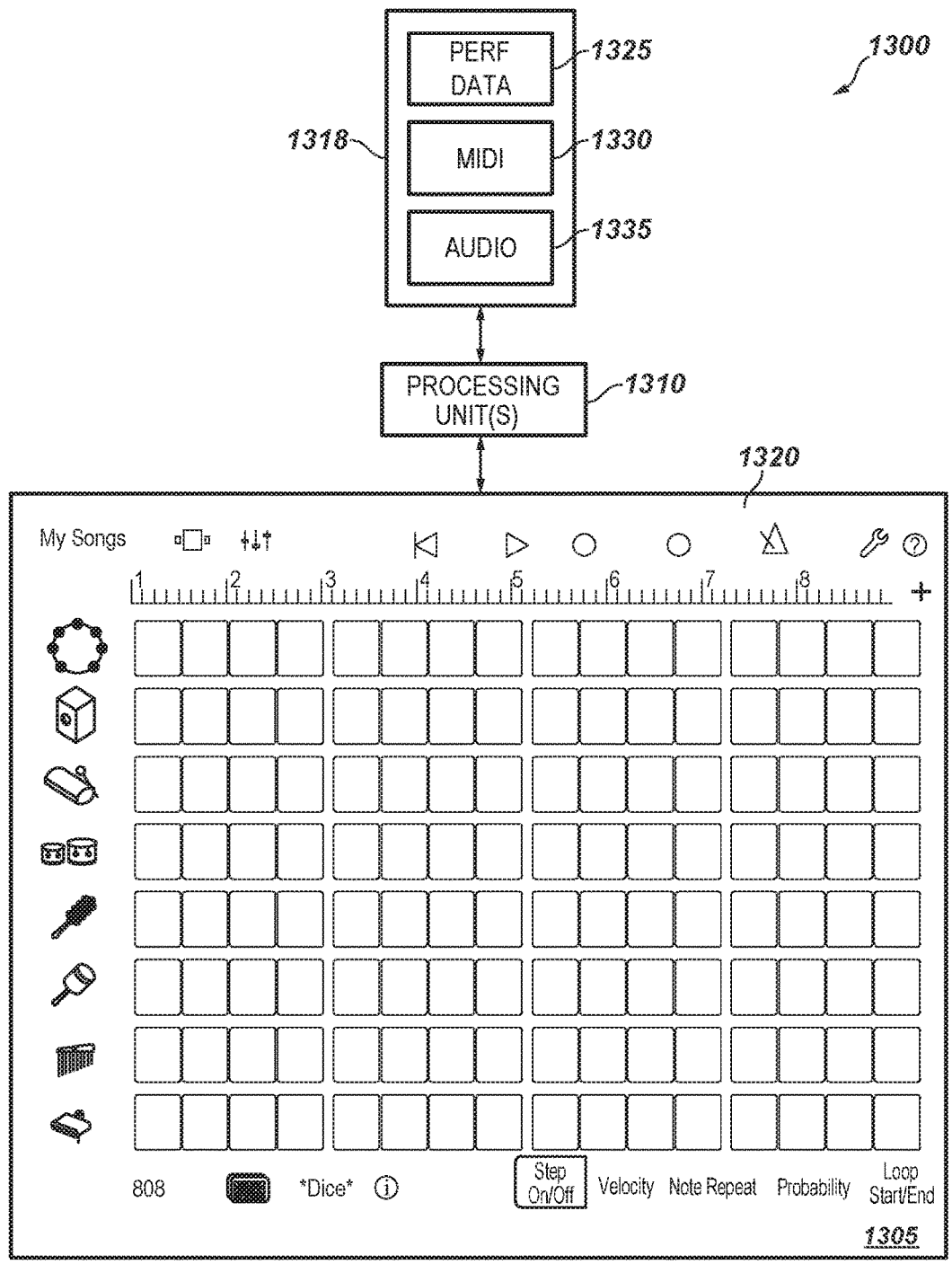
FIG. 13 illustrates an example of a system that can enable a user to operate a step sequencer on a software-based music application, according to certain embodiments.

FIG. 13 illustrates an example of a system 1300 that can enable a user to operate a step sequencer, according to certain embodiments. System 1300 can be a device that can include multiple subsystems such as a display subsystem 1305, one or more processors and/or processing units 1310, storage subsystem 1318, and communications system 1360. One or more communication paths can be provided to enable one or more of the subsystems to communicate with and exchange data with one another. The various subsystems in FIG. 13 can be implemented in software, hardware, firmware, or combinations thereof. In some embodiments, the software can be stored on a transitory or non-transitory computer readable storage medium and can be executed by one or more processing units. In certain embodiments, storage subsystem 1318 comprises one or more memories for storing the data used or generated by certain embodiments of the present invention and for storing software (e.g., code, computer instructions) that may be executed by one or more processing units 1310.

It should be appreciated that system 1300, as shown in FIG. 13, can include more or fewer components than those shown in FIG. 13, can combine two or more components, or can have a different configuration or arrangement of components. In some embodiments, system 1300 can be a part of a portable computing device, such as a tablet computer, a mobile telephone, a smart phone, a desktop computer, a laptop computer, a kiosk, wearable device, etc. The system 1300 can operate on an iPhone®, iPad®, iMac®, iWatch®, AppleTV®, or the like, to provide some specific examples.

In some embodiments, display subsystem 1305 can provide an interface (e.g., step sequencer) that allows a user to interact with system 1300. The display subsystem 1305 may be a cathode ray tube (CRT), a flat-panel device (e.g., a liquid crystal display (LCD) based device, LED-based device, plasma-based device, etc.), a projection device, a touch screen, or the like. In general, use of the term "output device" is intended to include all possible types of devices and mechanisms for outputting information from system 1300. For example, a software keyboard may be displayed using a flat-panel screen. In some embodiments, the display subsystem 1305 can be a touch interface, where the display provides both an interface for outputting information to a user of the device and also as an interface for receiving inputs. In other embodiments, there may be separate input and output subsystems. Through the display subsystem 1305, the user can view and interact with a GUI (Graphical User Interface) 1320 of a system 1300. In some embodiments, display subsystem 1305 can include a touch-sensitive interface (also sometimes referred to as a touch screen) that can both display information to the user and receive inputs from the user. Processing unit(s) 1310 can include one or more processors, each having one or more cores. In some embodiments, processing unit(s) 1310 can execute instructions stored in storage subsystem 1318. System 1300 can further include an audio system to play music (e.g., sequenced patterns—see FIG. 6A, musical performances, etc.) through one or more audio speakers (not shown).

A communications system (not shown) can include various hardware, firmware, and software components to enable electronic communication between multiple computing devices via Wi-Fi, Bluetooth, infra-red, Z-Wave, ZigBee, or any other suitable communications protocol that can provide sufficiently fast and reliable data rates to support the embodiments described herein.

Storage subsystem 1318 can include various memory units such as a system memory, a read-only memory (ROM), and non-volatile storage device(s). The system memory can be a read-and-write memory device or a volatile read-and-write memory, such as dynamic random access memory. System memory can store some or all of the instructions and data that the processor(s) or processing unit(s) need at runtime. ROM can store static data and instructions that are used by processing unit(s) 1310 and other modules of system 1300. Non-volatile storage device can be a read-and-write capable memory device. Embodiments of the invention can use a mass-storage device (such as a magnetic or optical disk or flash memory) as a permanent storage device. Other embodiments can use a removable storage device (e.g., a floppy disk, a flash drive) as a non-volatile (e.g., permanent) storage device.

Storage subsystem 1315 can store MIDI (Musical Instrument Digital Interface) data relating to notes played on a virtual instrument of system 1300 in MIDI database 1330. A performance data database 1325 can store performance data including velocity data, probability data, note count data (number of notes in per cell), audio pan data, etc. The audio database 1335 may store audio samples that may correspond (e.g., be assigned) to the arrays of a step sequencer. For example, in FIG. 13 a tambourine sound is assigned to the first array (first row) of the cell matrix. Further detail regarding system architecture and the auxiliary components thereof (e.g., input/output controllers, memory controllers, etc.) are not discussed in detail so as not to obfuscate the focus on the invention and would be understood by those of ordinary skill in the art.

Figure 14:
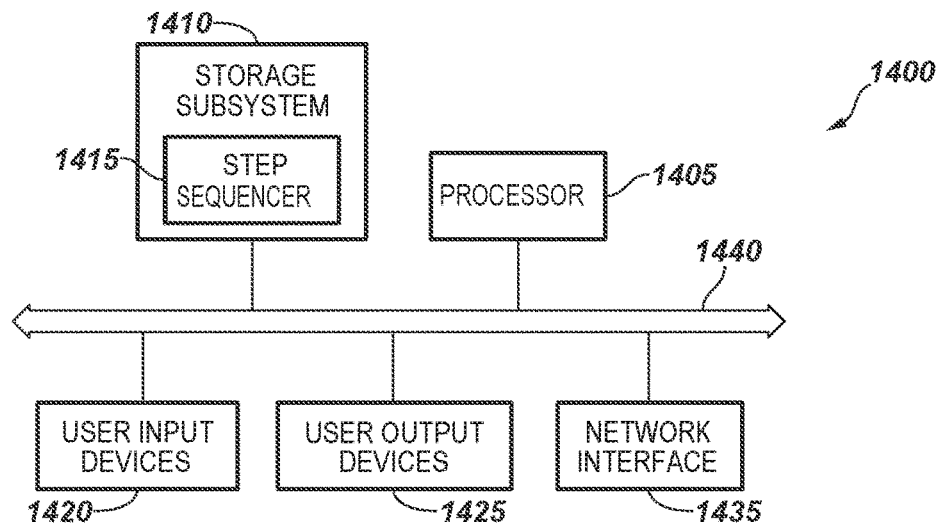
FIG. 14 illustrates an example of a computer system operable to run software configured to control a step sequencer, according to certain embodiments.

FIG. 14 illustrates a computer system 1400 operable to run software configured to control a step sequencer, according to certain embodiments. The user interfaces described herein (e.g., FIGS. 1-7C) can be implemented within a computer system such as computer system 1400 shown here. Computer system 1400 can be implemented as any of various computing devices, including, e.g., a desktop or laptop computer, tablet computer, smart phone, wearable device, head-mounted display (e.g., AR/VR systems), personal data assistant (PDA), or any other type of computing device and not limited to any particular form factor. Computer system 1400 can include processing unit(s) 1405, storage subsystem 1410, input devices 1420, output devices 1425, network interface 1435, and bus 1440. In some embodiments, system 1400 can be operated in within the framework of Garageband® or Logic®, developed by Apple Computer®.

Processing unit(s) 1405 can include a single processor, which can have one or more cores, or multiple processors. In some embodiments, processing unit(s) 1405 can include a general purpose primary processor as well as one or more special purpose co-processors such as graphics processors, digital signal processors, or the like. In some embodiments, some or all processing units 1405 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 1405 can execute instructions stored in storage subsystem 1410.

Storage subsystem 1410 can include various memory units such as a system memory, a read-only memory (ROM), and a permanent storage device. The ROM can store static data and instructions that are needed by processing unit(s) 1405 and other modules of electronic device 1400. The permanent storage device can be a read-and-write memory device. This permanent storage device can be a non-volatile memory unit that stores instructions and data even when computer system 1400 is powered down. Some embodiments of the invention can use a mass-storage device (such as a magnetic or optical disk or flash memory) as a permanent storage device. Other embodiments can use a removable storage device (e.g., a floppy disk, a flash drive) as a permanent storage device. The system memory can be a read-and-write memory device or a volatile read-and-write memory, such as dynamic random access memory. The system memory can store some or all of the instructions and data that the processor needs at runtime.

Storage subsystem 1410 can include any combination of computer readable storage media including semiconductor memory chips of various types (DRAM, SRAM, SDRAM, flash memory, programmable read-only memory) and so on. Magnetic and/or optical disks can also be used. In some embodiments, storage subsystem 1410 can include removable storage media that can be readable and/or writeable; examples of such media include compact disc (CD), read-only digital versatile disc (e.g., DVD-ROM, dual-layer DVD-ROM), read-only and recordable Blue-Ray® disks, ultra density optical disks, flash memory cards (e.g., SD cards, mini-SD cards, micro-SD cards, etc.), magnetic "floppy" disks, and so on. The computer readable storage media do not include carrier waves and transitory electronic signals passing wirelessly or over wired connections.

In some embodiments, storage subsystem 1410 can store one or more software programs to be executed by processing unit(s) 1405, such as a user interface 1415. As mentioned, "software" can refer to sequences of instructions that, when executed by processing unit(s) 1405 cause computer system 1400 to perform various operations, thus defining one or more specific machine implementations that execute and perform the operations of the software programs. The instructions can be stored as firmware residing in read-only memory and/or applications stored in magnetic storage that can be read into memory for processing by a processor.

Software can be implemented as a single program or a collection of separate programs or program modules that interact as desired. Programs and/or data can be stored in non-volatile storage and copied in whole or in part to volatile working memory during program execution. From storage subsystem 1410, processing unit(s) 1405 can retrieve program instructions to execute and data to process in order to execute various operations described herein.

A user interface can be provided by one or more user input devices 1420, display device 1425, and/or and one or more other user output devices (not shown). Input devices 1420 can include any device via which a user can provide signals to computing system 1400; computing system 1400 can interpret the signals as indicative of particular user requests or information. In various embodiments, input devices 1420 can include any or all of a keyboard touch pad, touch screen, mouse or other pointing device, scroll wheel, click wheel, dial, button, switch, keypad, microphone, and so on.

Output devices 1425 can display images generated by electronic device 1400. Output devices 1425 can include various image generation technologies, e.g., a cathode ray tube (CRT), liquid crystal display (LCD), light-emitting diode (LED) including organic light-emitting diodes (OLED), projection system, or the like, together with supporting electronics (e.g., digital-to-analog or analog-to-digital converters, signal processors, or the like), indicator lights, speakers, tactile "display" devices, headphone jacks, printers, and so on. Some embodiments can include a device such as a touchscreen that function as both input and output device.

In some embodiments, output device 1425 can provide a graphical user interface, in which visible image elements in certain areas of output device 1425 are defined as active elements or control elements that the user selects using user input devices 1420. For example, the user can manipulate a user input device to position an on-screen cursor or pointer over the control element, then click a button to indicate the selection. Alternatively, the user can touch the control element (e.g., with a finger or stylus) on a touchscreen device. In some embodiments, the user can speak one or more words associated with the control element (the word can be, e.g., a label on the element or a function associated with the element). In some embodiments, user gestures on a touch-sensitive device can be recognized and interpreted as input commands; these gestures can be but need not be associated with any particular array in output device 1425. Other user interfaces can also be implemented.

Network interface 1435 can provide voice and/or data communication capability for electronic device 1400. In some embodiments, network interface 1435 can include radio frequency (RF) transceiver components for accessing wireless voice and/or data networks (e.g., using cellular telephone technology, advanced data network technology such as 3G, 4G or EDGE, 5G, WiFi (IEEE 802.11 family standards, or other mobile communication technologies, or any combination thereof), GPS receiver components, and/or other components. In some embodiments, network interface 1435 can provide wired network connectivity (e.g., Ethernet) in addition to or instead of a wireless interface. Network interface 1435 can be implemented using a combination of hardware (e.g., antennas, modulators/demodulators, encoders/decoders, and other analog and/or digital signal processing circuits) and software components.

Bus 1440 can include various system, peripheral, and chipset buses that communicatively connect the numerous internal devices of electronic device 1400. For example, bus 1440 can communicatively couple processing unit(s) 1405 with storage subsystem 1410. Bus 1440 also connects to input devices 1420 and display 1425. Bus 1440 also couples electronic device 1400 to a network through network interface 1435. In this manner, electronic device 1400 can be a part of a network of multiple computer systems (e.g., a local area network (LAN), a wide area network (WAN), an Intranet, or a network of networks, such as the Internet. Any or all components of electronic device 1400 can be used in conjunction with the invention.

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter.

It will be appreciated that computer system 1400 is illustrative and that variations and modifications are possible. Computer system 1400 can have other capabilities not specifically described here (e.g., mobile phone, global positioning system (GPS), power management, one or more cameras, various connection ports for connecting external devices or accessories, etc.). Further, while computer system 1400 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

While the invention has been described with respect to specific embodiments, one skilled in the art will recognize that numerous modifications are possible including the displayed representation of the step sequencers of FIGS. 2-7C and the configuration of the various elements therein, such as their position, organization, and function, filtering rules and analysis, etc. Thus, although the invention has been described with respect to specific embodiments, it will be appreciated that the invention is intended to cover all modifications and equivalents within the scope of the following claims.

Figure 15:
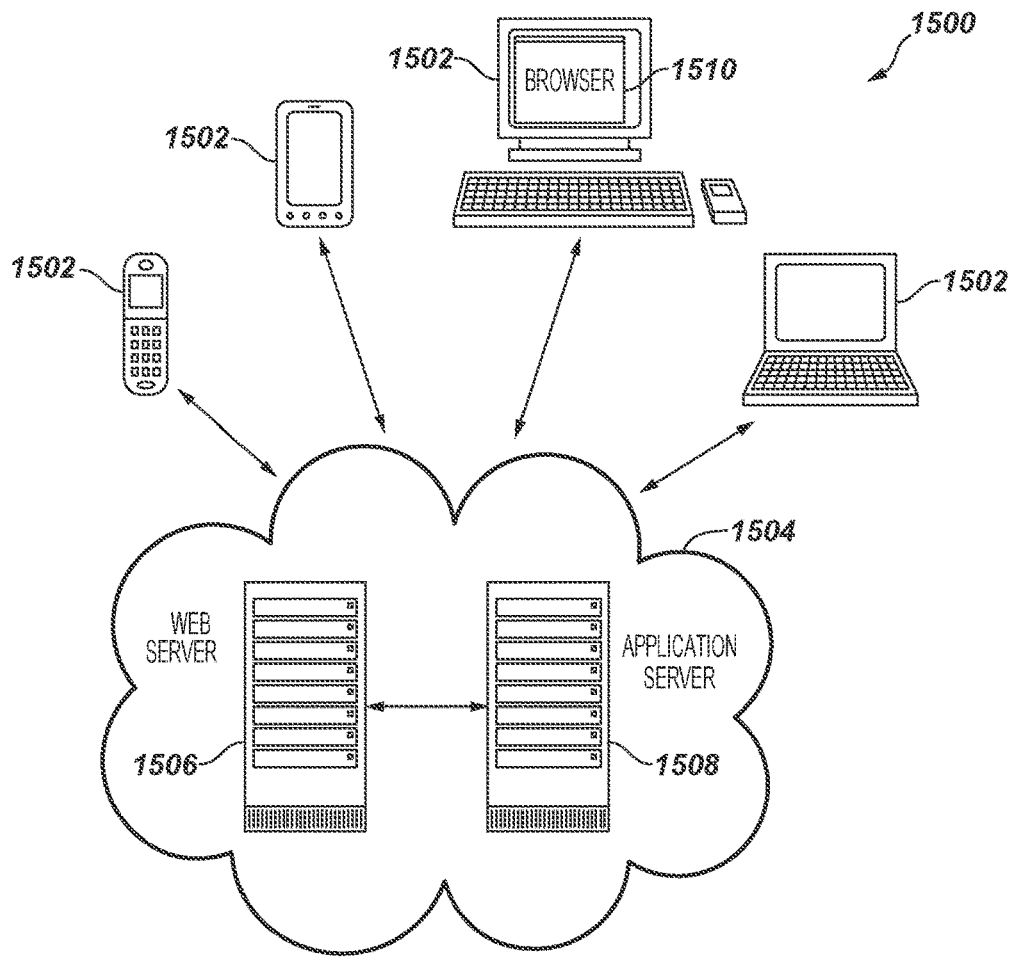
FIG. 15 illustrates a simplified diagram of a distributed system for providing a system and method for operating a step sequencer, according to certain embodiments.

FIG. 15 depicts a simplified diagram of a distributed system 1500 for providing a system and method for operating a step sequencer, according to certain embodiments. In the embodiment depicted in FIG. 15, system 1500 is provided on a server 1504 that is communicatively coupled with a remote client device 1502(1)-(4) via network 1506. Server 1504 may include one or more web servers 1508, application servers 1510, or a combination thereof, or any suitable server based infrastructure.

Network 1506 may include one or more communication networks, which could be the Internet, a local area network (LAN), a wide area network (WAN), a wireless or wired network, an Intranet, a private network, a public network, a switched network, or any other suitable communication network. Network 1506 may include many interconnected systems and communication links including but not restricted to hardwire links, optical links, satellite or other wireless communications links, wave propagation links, or any other ways for communication of information. Various communication protocols may be used to facilitate communication of information via network 1506, including but not restricted to TCP/IP, HTTP protocols, extensible markup language (XML), wireless application protocol (WAP), protocols under development by industry standard organizations, vendor-specific protocols, customized protocols, and others. In the configuration depicted in FIG. 15, aspects of system 1500 may be displayed by client device 1502.

In the configuration depicted in FIG. 15, system 1500 is remotely located from client device(s) 1502(1)-(4). In some embodiments, server 1504 may operate the step sequencer functions described herein. In some embodiments, the services provided by server 1204 may be offered as web-based or cloud services or under a Software as a Service (SaaS) model.

It should be appreciated that various different distributed system configurations are possible, which may be different from distributed system 1500 depicted in FIG. 15. The embodiment shown in FIG. 15 is thus only one example of system for operating a step sequencer and is not intended to be limiting.

While the invention has been described with respect to specific embodiments, one skilled in the art will recognize that numerous modifications are possible. Thus, although the invention has been described with respect to specific embodiments, it will be appreciated that the invention is intended to cover all modifications and equivalents thereof.

Any element in a claim that does not explicitly state "means for" performing a specified function, or "step for" performing a specific function, is not to be interpreted as a "means" or "step" clause as specified in 35 U.S.C. § 112, sixth paragraph. In particular, the use of "step of" in the claims herein is not intended to invoke the provisions of 35 U.S.C. § 112, sixth paragraph.

What is claimed is:

1. A UI for controlling a virtual musical instrument implemented on a display, the UI comprising:
    a step sequencer having a matrix of user-selectable cells displayed in a predefined area, the matrix including:
    at least one row of user-selectable cells,
        each row of the matrix corresponding to audio sample data stored in a computer-readable medium and the cells within each array of the matrix being configured in a sequential arrangement,
        each cell, in response to being selected for playback and upon being triggered to begin the playback, causes the audio sample data of its corresponding array to output audio corresponding to its corresponding audio sample data,
    a playback control that, in response to receiving a playback input, causes a real-time playback of the corresponding audio sample data for each selected cell by triggering the playback in an order defined by a tempo and the sequential arrangement of the cells,
    a plurality of dynamic navigation objects including a first miniaturized visual representation of selected cells within a first portion of the matrix of user-selectable cells and a second miniaturized visual representation of selected cells within of a second portion of the matrix of user selectable cells, the first portion including a different number of user-selectable cells than the second portion,
    wherein the step sequencer is configured to display the first portion of the matrix, such that it fills the predefined area and the second portion of the matrix is not visible, in response to the first miniaturized representation being selected, and
    wherein the step sequencer is configured to display the second portion of the matrix, such that it fills the predefined area and the first portion of the matrix is not visible, in response to the second miniaturized representation being selected.

2. The UI of claim 1 wherein the matrix corresponds to a single sequenced rhythmic pattern.

3. The UI of claim 1 wherein the first portion of the matrix corresponds to a first number of columns of user-selectable cells, and wherein the second portion of the matrix corresponds to a second number of columns of user-selectable cells, the second number of columns of user-selectable cells being different user-selectable cells than the first number of columns of user-selectable cells.

4. The UI of claim 1 wherein the plurality of dynamic navigation objects are selectable thumbnails.

5. The UI of claim 1 wherein each of the dynamic navigation objects depicts all of the user-selectable cells of its corresponding portion of the matrix.

6. The UI of claim 5 wherein each dynamic navigation object highlights any selected user-selectable cells of its corresponding portion of the matrix.

7. The UI of claim 6 wherein each dynamic navigation object includes an indicator that indicates which column of cells of its corresponding portion of the matrix are being played.

8. A method of operating a UI for controlling a virtual musical instrument implemented on a display, the method comprising:
    receiving an input corresponding to a selection of a dynamic navigation object of a plurality of dynamic navigation objects configured on the display, the display including a cell matrix displayed in a predefined area, the cell matrix including one or more arrays of user-selectable cells, each cell within the cell matrix arranged in a sequential arrangement within its corresponding array of cells, each array of the cell matrix assigned to audio sample data stored in a computer-readable medium that, in response to being triggered, causes the audio sample data to output corresponding audio, and each cell within its particular array of the cell matrix, in response to being selected for playback and upon being triggered to begin playback, causes the audio sample data corresponding to the cell's particular array to be played,
    wherein the plurality of dynamic navigation objects including a first miniaturized visual representation of selected cells within a first portion of the matrix of user-selectable cells and a second miniaturized visual representation of selected cells within of a second portion of the matrix of user selectable cells, the first portion including a different number of user-selectable cells than the second portion,
    displaying the first portion of the cell matrix in response to the first miniaturized representation being selected, such that the first portion of the cell matrix is visible in the predefined area and the second portion of the cell matrix is not visible in the predefined area; and displaying the second portion of the cell matrix in response to the second miniaturized representation being selected, such that the second portion of the cell matrix is visible in the predefined area and the first portion of the cell matrix is not visible in the predefined area.

9. The method of claim 8 wherein the matrix corresponds to a single sequenced rhythmic pattern.

10. The method of claim 8 wherein the first portion of the matrix corresponds to a first number of columns of user-selectable cells, and wherein the second portion of the matrix corresponds to a second number of columns of user-selectable cells, the second number of columns of user-selectable cells being different user-selectable cells than the first number of columns of user-selectable cells.

11. The method of claim 8 wherein each of the dynamic navigation objects depicts all of the user-selectable cells of its corresponding portion of the matrix and highlights any selected user-selectable cells of its corresponding portion of the matrix.

12. The method of claim 11 wherein each dynamic navigation object includes an indicator that indicates which column of cells of its corresponding portion of the matrix are being played.

13. A system comprising:
one or more processors; and
one or more non-transitory storage mediums containing instructions that cause the one or more processors to perform operations including:
receiving an input corresponding to a selection of a dynamic navigation object of a plurality of dynamic navigation objects configured on a display, the display including a cell matrix displayed in a predefined area, the cell matrix including one or more arrays of user-selectable cells, each cell within the cell matrix arranged in a sequential arrangement within its corresponding array of cells, each array of the cell matrix assigned to audio sample data stored in a computer-readable medium that, in response to being triggered, causes the audio sample data to output corresponding audio, and each cell within its particular array of the cell matrix, in response to being selected for playback and upon being triggered to begin playback, causes the audio sample data corresponding to the cell's particular array to be played,
wherein the plurality of dynamic navigation objects including a first miniaturized visual representation of selected cells within a first portion of the matrix of user-selectable cells and a second miniaturized visual representation of selected cells within of a second portion of the matrix of user selectable cells, the first portion including a different number of user-selectable cells than the second portion,
displaying the first portion of the cell matrix in response to the first miniaturized representation being selected, such that the first portion of the cell matrix is visible in the predefined area and the second portion of the cell matrix is not visible in the predefined area; and
displaying the second portion of the cell matrix in response to the second miniaturized representation being selected, such that the second portion of the cell matrix is visible in the predefined area and the first portion of the cell matrix is not visible in the predefined area.

14. The system of claim 13 wherein the matrix corresponds to a single sequenced rhythmic pattern.

15. The system of claim 13 wherein the first portion of the matrix corresponds to a first number of columns of user-selectable cells, and wherein the second portion of the matrix corresponds to a second number of columns of user-selectable cells, the second number of columns of user-selectable cells being different user-selectable cells than the first number of columns of user-selectable cells.

16. The system of claim 13 wherein each of the dynamic navigation objects depicts all of the user-selectable cells of its corresponding portion of the matrix and highlights any selected user-selectable cells of its corresponding portion of the matrix, and wherein each dynamic navigation object includes an indicator that indicates which column of cells of its corresponding portion of the matrix are being played.

17. A computer-program product tangibly embodied in a machine-readable non-transitory storage medium including instructions to cause a processor to perform operations including:
receive an input corresponding to a selection of a dynamic navigation object of a plurality of dynamic navigation objects configured on a display, the display including a cell matrix displayed in a predefined area, the cell matrix including one or more arrays of user-selectable cells, each cell within the cell matrix arranged in a sequential arrangement within its corresponding array of cells, each array of the cell matrix assigned to audio sample data stored in a computer-readable medium that, in response to being triggered, causes the audio sample data to output corresponding audio, and each cell within its particular array of the cell matrix, in response to being selected for playback and upon being triggered to begin playback, causes the audio sample data corresponding to the cell's particular array to be played,
wherein the plurality of dynamic navigation objects including a first miniaturized visual representation of selected cells within a first portion of the matrix of user-selectable cells and a second miniaturized visual representation of selected cells within of a second portion of the matrix of user selectable cells, the first portion including a different number of user-selectable cells than the second portion,
display the first portion of the cell matrix in response to the first miniaturized representation being selected, such that the first portion of the cell matrix is visible in the predefined area and the second portion of the cell matrix is not visible in the predefined area; and
display the second portion of the cell matrix in response to the second miniaturized representation being selected, such that the second portion of the cell matrix is visible in the predefined area and the first portion of the cell matrix is not visible in the predefined area.

18. The computer-program product of claim 17 wherein the matrix corresponds to a single sequenced rhythmic pattern.

19. The computer-program product of claim 17 wherein the first portion of the matrix corresponds to a first number of columns of user-selectable cells, and wherein the second portion of the matrix corresponds to a second number of columns of user-selectable cells, the second number of columns of user-selectable cells being different user-selectable cells than the first number of columns of user-selectable cells.

20. The computer-program product of claim 17 wherein each of the dynamic navigation objects depicts all of the user-selectable cells of its corresponding portion of the matrix and highlights any selected user-selectable cells of its corresponding portion of the matrix, and wherein each dynamic navigation object includes an indicator that indicates which column of cells of its corresponding portion of the matrix are being played.

* * * * *

UNITED STATES PATENT AND TRADEMARK OFFICE
CERTIFICATE OF CORRECTION

PATENT NO. : 10,509,529 B2  
APPLICATION NO. : 15/963811  
DATED : December 17, 2019  
INVENTOR(S) : Joshua W. Decker and Robert W. Baker Page 1 of 1

It is certified that error appears in the above-identified patent and that said Letters Patent is hereby corrected as shown below:

In the Claims

Claim 13, Column 29, Line 51, delete "within of a second" and insert -- within a second --

Claim 17, Column 30, Line 39, delete "cells within of a second" and insert -- cells with a second --

Signed and Sealed this  
Twenty-first Day of January, 2020

Andrei Iancu  
*Director of the United States Patent and Trademark Office*